(12) United States Patent
Gabriel

(10) Patent No.: US 10,460,139 B1
(45) Date of Patent: Oct. 29, 2019

(54) SYSTEM AND METHOD FOR UNIQUE IDENTIFIER DETECTION BASED ON INVISIBLE LIGHT

(71) Applicant: Intuit Inc., Mountain View, CA (US)

(72) Inventor: Michael Richard Gabriel, Portola Valley, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 16/111,900

(22) Filed: Aug. 24, 2018

(51) Int. Cl.
*G06K 7/12* (2006.01)
*G06T 19/00* (2011.01)
*G06K 19/14* (2006.01)
*G06K 19/06* (2006.01)

(52) U.S. Cl.
CPC ......... *G06K 7/12* (2013.01); *G06K 19/06037* (2013.01); *G06K 19/14* (2013.01); *G06T 19/006* (2013.01); *G06K 2019/06225* (2013.01)

(58) Field of Classification Search
None
See application file for complete search history.

(56) References Cited

U.S. PATENT DOCUMENTS 9,291,559 B2 * 3/2016 Hussain ............... G01N 21/643
2006/0249951 A1 * 11/2006 Cruikshank ............ B42D 25/29
283/92

* cited by examiner

*Primary Examiner* — Kristy A Haupt
(74) *Attorney, Agent, or Firm* — Hawley Troxell Ennis & Hawley LLP; Philip McKay

(57) ABSTRACT

An invisible light sensing device senses invisible light from a plurality of invisible light emitting objects in which each of the invisible light emitting objects emits invisible light in an identification pattern that is distinct from other identification patterns. An identification pattern is based on one or more apertures through which invisible light is emitted to form the identification pattern. An identification pattern is also based on a plurality of invisible light emitters in which at least a portion of the invisible light emitters are positioned and activated to form the identification pattern.

26 Claims, 13 Drawing Sheets

| 981 | FIDUCIAL MARKER | POINT OF REFERENCE |
| --- | --- | --- |
| 982 | OBJECT TYPE | TOY CAR |
| 983 | UNIQUE IDENTIFIER | 4321 |

SYSTEM AND METHOD FOR UNIQUE IDENTIFIER DETECTION BASED ON INVISIBLE LIGHT

BACKGROUND

Augmented reality, mixed reality, virtual reality, and other forms of digital reality as discussed herein, or as known in the art at the time of filing, or as developed, or becomes available, after the time of filing, can include interaction with real objects. With augmented reality, a user may view real objects or representations of real objects and a display component may add digital information about one or more of the real objects. For example, a heads-up display on a jet fighter may add a distance indication near a viewed enemy aircraft. For further example, a golfer may point a camera of a smartphone at a flag of a hole on the green, and a representation of the flag may be displayed on the display of the smartphone with a distance indication of the golfer from the hole. With mixed reality, a user may view real-world objects alongside virtual objects. For example, goggles may display a representation of a real object, such as a table, as viewed through a front-facing camera and the goggles may add a digital image of a virtual object, such as a bottle resting on the table, and when the user reaches for the digital image of the bottle, nothing is actually present on the table. For further example, a user may view on a display of a smartphone a representation of a user's face, and a digital image of a moustache may be overlaid the representation of the user's face. With virtual reality, a user may view a created virtual world. For example, a user may wear a headset with a display and walk through a virtual maze, yet because the user is ambulatory, the user may bump into real objects in the user's actual environment, despite the fictional environment viewed through the headset.

In current augmented reality and mixed reality environments, it is desirable to identify real objects. Such identification is typically done using global positioning system (GPS) technology. For example, a user may desire to go to a restaurant and may point a camera of a smartphone at the storefront of the restaurant building. The smartphone may use GPS processing to determine the location of the camera and may use at least one accelerometer to determine the direction the camera is pointing. Such information may be used to determine the address of the building being viewed by the user through the camera. Using such GPS technology, the building may be identified based on a location database that records the locations of restaurants, and the smartphone may, for example, display a rating of the restaurant occupying the building based on the determined location of the building.

However, such identification of the location of an object is insufficient at least for mobile objects, small stationary objects near each other, and stationary objects not tracked in a location database. For example, a user may wish to eat from a food truck but wants to determine the quality of the mobile restaurant before ordering a meal. If the user points a smartphone's camera at the food truck, although the smartphone may be able to determine the physical location of the food truck, it is not possible to know which restaurant is being used by the food truck utilizing GPS because any food truck could be parked at that particular location on the street. The user must rely on inputting into the smartphone the name of the restaurant displayed on the food truck in order to acquire a review of the restaurant utilizing the food truck.

Using a visible identifier, such as a restaurant sign on a food truck that a user sees, may be undesirable for certain objects, such as objects that are desired to look identical to users. For example, an augmented reality or virtual reality racing game may involve real objects of toy cars or other action figures, and it is desirable for all of the toy cars to look identical to each other. In this example, each toy car may have the same physical features and identical coats of paint, such that a typical user is unable to distinguish representations of the toy cars on a display of a smartphone. Furthermore, if each toy car is a remote-control car, the movement of each car precludes identification through a smartphone's typical GPS technology of any one car. For further example, objects based on Internet of Things (IoT) may all desirably look identical in a user's home, where it is undesirable to have a visible identification marker such as a visible quick response code. For example, IoT floor lamps may be located in a user's living room, but may nevertheless need to be uniquely identifiable to control the lighting operations of each of the IoT lamps, where such IoT floor lamps are too proximate to each other to be identifiable using a smartphone's GPS technology.

Consequently, there is currently a significant need in the digital reality arts, such as augmented reality and mixed reality, to provide a system and method to uniquely identify real objects that are visually indistinguishable from each other.

SUMMARY

Embodiments of the present disclosure provide a technical solution to the technical problem of uniquely identifying objects that are visually indistinguishable.

The disclosed technical solution includes providing a device and an object. In one embodiment, the device is an invisible light sensing device and the object is an invisible light emitting object. In one embodiment, the invisible light sensing device senses invisible light from a plurality of invisible light emitting objects in which each of the invisible light emitting objects emits invisible light in an identification pattern that is distinct from other identification patterns. In one embodiment, an identification pattern is based on one or more defined apertures through which invisible light is emitted to form the identification pattern. In one embodiment, the invisible light acquires the identification pattern as it passes through the one or more defined apertures.

In one embodiment, the object has an invisible light source coupled to an object housing of the object. In one embodiment, an invisible light source is configured to emit invisible light. In one embodiment, invisible light is electromagnetic radiation that is undetectable by a normal human eye. In one embodiment, invisible light has a wavelength in the electromagnetic spectrum that is too short or too long to be detected by a normal human eye. In one embodiment, invisible light has a wavelength that is less than 380 nanometers (nm) or greater than 750 nm, which is nonvisible to an average human eye. In one embodiment, invisible light includes, but is not limited to, infrared light, ultraviolet light, radio wave, x-ray, gamma ray, and any other invisible electromagnetic radiation, as discussed herein, or as known in the art at the time of filing, or as developed, or becomes available, after the time of filing. In one embodiment, infrared light has a wavelength that is greater than 750 nm and less than 1 millimeter (mm).

In one embodiment, the object includes an opaque substrate that is coupled to the object housing. In one embodiment, the opaque substrate defines an enclosure within which the invisible light source resides. In one embodiment, the opaque substrate is opaque to invisible light. In one embodiment, the invisible light source comprises an infrared light emitter and the opaque substrate is opaque to infrared light.

In one embodiment, the opaque substrate defines an aperture design configured to receive invisible light from the invisible light source enclosed by the opaque substrate. In one embodiment, invisible light from the invisible light source escapes the object through the aperture design defined by the opaque substrate. In one embodiment, the aperture design forms an identification pattern with the escaping invisible light. In one embodiment, the identification pattern of one object is different from an identification pattern of any other object of the system. In one embodiment, the aperture design represents an aperture defined by the opaque substrate. In one embodiment, the aperture design represents a plurality of apertures defined by the opaque substrate. In one embodiment, the identification pattern of the aperture design defined by the opaque substrate represents an information code, such as a bar code, a quick response (QR) code, and other information codes as discussed herein, or as known in the art at the time of filing, or as developed, or becomes available, after the time of filing.

In one embodiment, the object includes a transparent substrate that is coupled to the opaque substrate. In one embodiment, the transparent substrate is transparent to invisible light. In one embodiment, the invisible light source emits infrared light and the transparent substrate is transparent to infrared light. In one embodiment, the transparent substrate provides a layer, such as a protective layer, over the aperture design of the opaque substrate. In one embodiment, the aperture design is represented by one or more apertures defined by the opaque substrate, and the transparent substrate is positioned as a barrier between the object's external environment and the enclosure formed, at least in part, by the opaque substrate. In one embodiment, the transparent substrate provides a layer, such as a protective layer, over the aperture design that separates the enclosure from the object's surrounding environment. For example, the transparent substrate may prevent rain from leaking into the enclosure when the object is placed outdoors in rainy conditions.

In one embodiment, the device includes an invisible light sensor that is coupled to a device housing. In one embodiment, the device includes a device control circuit that is coupled to the device housing and electronically coupled to the invisible light sensor. In one embodiment, the invisible light sensor is configured to sense invisible light, such as invisible light emitted from an object. In one embodiment, an invisible light sensor is an invisible light detecting camera, an invisible light detector, an invisible light sensing cell, an invisible light absorber, an invisible light sensing LED, and any other invisible light sensors, as discussed herein, or as known in the art at the time of filing, or as developed, or becomes available, after the time of filing.

In one embodiment, the device control circuit detects the identification pattern of the invisible light sensed by the invisible light sensor. In one embodiment, the device control circuit detects information represented by the identification pattern. In one embodiment, the device control circuit determines an object unique identifier based on the detected identification pattern. For example, when an identification pattern represents a QR code, the device control circuit may determine a unique serial number from the QR code.

In one embodiment, the device includes a display component that is coupled to the device housing and electronically coupled to the device control circuit. In one embodiment, the display component provides to a user of the device a display to the user such as, but not limited to, an interface, an image, a hologram, an assistance resource, a background, an avatar, a highlighting mechanism, an icon, and any other displays that individually, or in combination, create a user experience, as discussed herein, or as known in the art at the time of filing, or as developed, or becomes available, after the time of filing.

In one embodiment, the display component displays the object unique identifier to a user. In one embodiment, the display component displays the detected identification pattern as an object unique identifier. In one embodiment, the display component displays a representation of the object and the detected identification pattern. In one embodiment, the display component displays a representation of the object and the object unique identifier that is positioned on the display in relation to the represented object. For example, if the object is a toy car, and the identification pattern is detected from the roof of the toy car, the display component shows the object unique identifier on the displayed representation of the roof of the toy car.

The disclosed technical solution includes providing a device and an object. In one embodiment, the device is an invisible light sensing device and the object is an invisible light emitting object. In one embodiment, the invisible light sensing device senses invisible light from a plurality of invisible light emitting objects in which each of the invisible light emitting objects emits invisible light in an identification pattern that is distinct from other identification patterns. In one embodiment, an identification pattern is based on a plurality of invisible light emitters that emit invisible light to form an identification pattern. In one embodiment, the invisible light emitters are positioned to form an identification pattern when at least a portion of the invisible light emitters are activated. In one embodiment, the invisible light emitters are arranged in a two-dimensional grid and an identification pattern is formed by a portion of the invisible light emitters of the grid being activated.

In one embodiment, the object has a plurality of invisible light emitters coupled to an object housing of the object. In one embodiment, each of a plurality of invisible light emitters is configured to emit invisible light. In one embodiment, invisible light is electromagnetic radiation that is undetectable by a normal human eye. In one embodiment, invisible light has a wavelength in the electromagnetic spectrum that is too short or too long to be detected by a normal human eye. In one embodiment, invisible light has a wavelength that is less than 380 nanometers (nm) or greater than 750 nm, which is nonvisible to an average human eye. In one embodiment, invisible light includes, but is not limited to, infrared light, ultraviolet light, radio wave, x-ray, gamma ray, and any other invisible electromagnetic radiation, as discussed herein, or as known in the art at the time of filing, or as developed, or becomes available, after the time of filing. In one embodiment, infrared light has a wavelength that is greater than 750 nm and less than 1 millimeter (mm).

In one embodiment, the object includes an opaque substrate that is coupled to the object housing. In one embodiment, the opaque substrate defines an enclosure within which the plurality of invisible light emitters resides. In one embodiment, the opaque substrate is opaque to invisible light. In one embodiment, each of the plurality of invisible light emitters comprises an infrared light emitter and the opaque substrate is opaque to infrared light.

In one embodiment, the opaque substrate defines a plurality of pattern apertures such that each pattern aperture is configured to receive invisible light from a respective one of the invisible light emitters enclosed by the opaque substrate. In one embodiment, invisible light from the plurality of invisible light emitters escapes the object through the respective one of the pattern apertures defined by the opaque substrate. In one embodiment, the plurality of activated invisible light emitters that emit light that escapes the respective pattern apertures forms an identification pattern from the escaping invisible light. In one embodiment, the identification pattern of one object is different from an identification pattern of any other object of the system. In one embodiment, the plurality of pattern apertures is defined by the opaque substrate. In one embodiment, each one of the plurality of invisible light emitters corresponds to a respective one of the plurality of pattern apertures. In one embodiment, a portion of the plurality of invisible light emitters is activated to form an identification pattern.

In one embodiment, the object includes a transparent substrate that is coupled to the opaque substrate. In one embodiment, the transparent substrate is transparent to invisible light. In one embodiment, the plurality of invisible light emitters emits infrared light and the transparent substrate is transparent to infrared light. In one embodiment, the transparent substrate provides a layer, such as a protective layer, over the plurality of pattern apertures of the opaque substrate. In one embodiment, the transparent substrate is positioned as a barrier between the object's external environment and the enclosure formed, at least in part, by the opaque substrate. In one embodiment, the transparent substrate provides a layer, such as a protective layer, over the plurality of pattern apertures that separates the enclosure from the object's surrounding environment. For example, the transparent substrate may prevent rain from leaking into the enclosure when the object is placed outdoors in rainy conditions.

In one embodiment, the device includes an invisible light sensor that is coupled to a device housing. In one embodiment, the device includes a device control circuit that is coupled to the device housing and electronically coupled to the invisible light sensor. In one embodiment, the invisible light sensor is configured to sense invisible light, such as invisible light emitted from an object. In one embodiment, an invisible light sensor is an invisible light detecting camera, an invisible light detector, an invisible light sensing cell, an invisible light absorber, an invisible light sensing LED, and any other invisible light sensors, as discussed herein, or as known in the art at the time of filing, or as developed, or becomes available, after the time of filing.

In one embodiment, the device control circuit detects the identification pattern of the invisible light sensed by the invisible light sensor. In one embodiment, the device control circuit detects information represented by the identification pattern. In one embodiment, the device control circuit determines an object unique identifier based on the detected identification pattern. For example, when an identification pattern represents a portion of activated invisible light emitters having an identification pattern of variously positioned invisible light emitters, the device control circuit may determine a unique serial number from the identification pattern.

In one embodiment, the device includes a display component that is coupled to the device housing and electronically coupled to the device control circuit. In one embodiment, the display component provides to a user of the device a display to the user such as, but not limited to, an interface, an image, a hologram, an assistance resource, a background, an avatar, a highlighting mechanism, an icon, and any other displays that individually, or in combination, create a user experience, as discussed herein, or as known in the art at the time of filing, or as developed, or becomes available, after the time of filing.

In one embodiment, the display component displays the object unique identifier to a user. In one embodiment, the display component displays the detected identification pattern as an object unique identifier. In one embodiment, the display component displays a representation of the object and the detected identification pattern. In one embodiment, the display component displays a representation of the object and the object unique identifier that is positioned on the display in relation to the represented object. For example, if the object is a toy car, and the identification pattern is detected from the roof of the toy car, the display component shows the object unique identifier on the displayed representation of the roof of the toy car.

Figure 1:
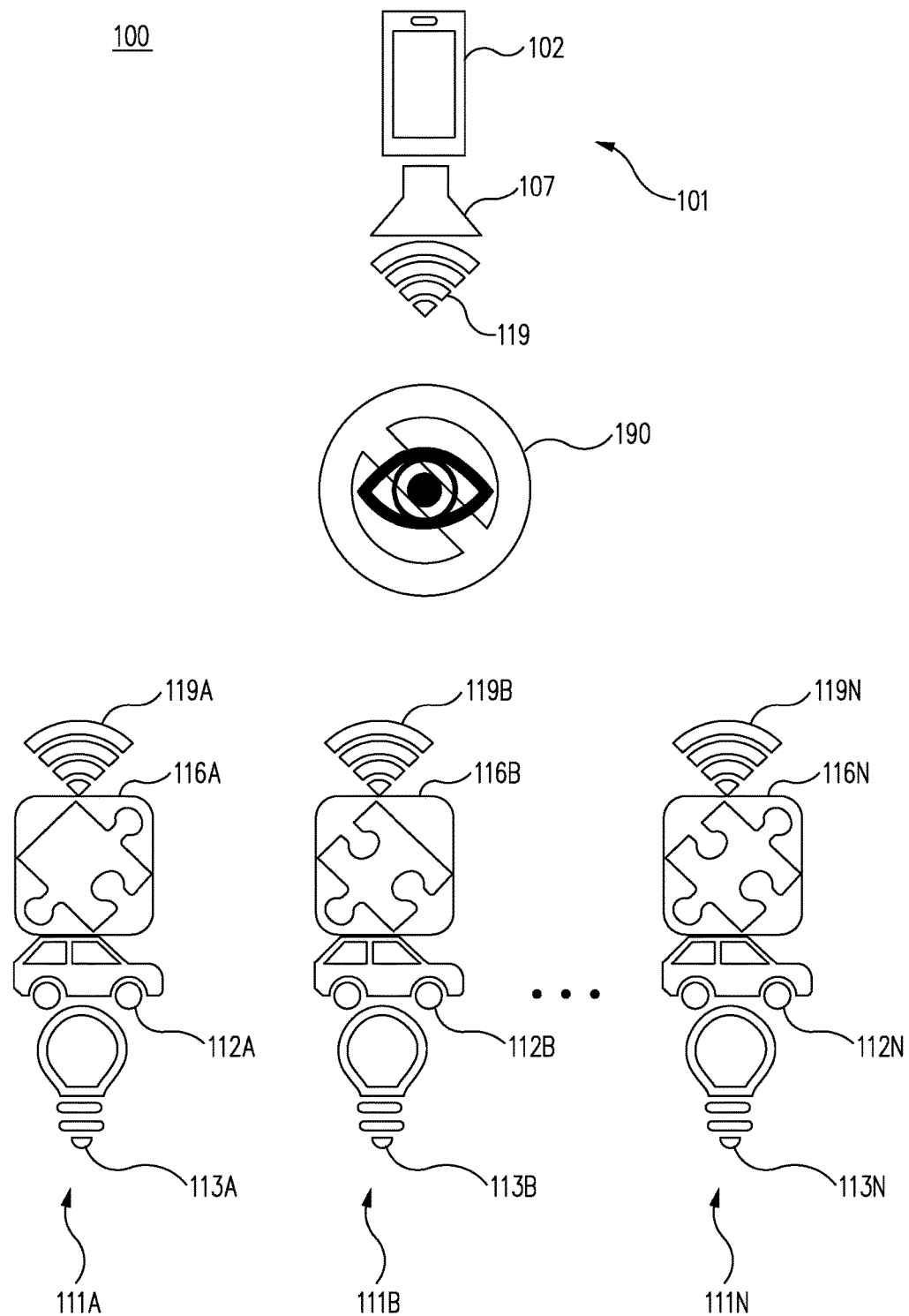
FIG. 1 is a pictorial diagram of a unique identifier detection system, in accordance with one embodiment.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

Overview

As discussed in more detail below, embodiments of the present disclosure represent a technical solution to the technical problem of uniquely identifying objects that are visually indistinguishable. In one embodiment, an invisible light sensing device senses invisible light from a plurality of invisible light emitting objects, in which each of the invisible light emitting objects emits invisible light in an identification pattern that is distinct from other identification patterns. In one embodiment, an identification pattern is based on one or more apertures through which invisible light is emitted to form an identification pattern. In one embodiment, an identification pattern is based on a plurality of invisible light emitters that emit invisible light to form an identification pattern. In one embodiment, the invisible light sensing device senses the emitted invisible light and detects the identification pattern associated with the respective invisible light emitting object.

FIG. 1 is a pictorial diagram of a unique identifier detection system 100, in accordance with one embodiment. As depicted in the embodiment of FIG. 1, there is a device 101 that includes a device housing 102 and an invisible light sensor 107. It is to be understood that the device housing 102 is not limited to the graphic depicted in FIG. 1, as it is depicted for illustrative purposes. In one embodiment, the form of the device housing 102 is any invisible light detecting device housing, such as a camera, a smartphone, smart glasses, a headset, and any other invisible light detecting device housing, as discussed herein, or as known in the art at the time of filing, or as developed, or becomes available, after the time of filing. It is also to be understood that the invisible light sensor 107 is not limited to the graphic depicted in FIG. 1, as it is depicted for illustrative purposes. For example, the invisible light sensor 107 may be attached internally to the device housing 102, externally to the device housing 102, or any other integral attachment, as discussed herein, or as known in the art at the time of filing, or as developed, or becomes available, after the time of filing.

As depicted in the embodiment of FIG. 1, there is a plurality of objects 111A and 111B through 111N, and it is to be understood that there may be any number of such objects. In one embodiment, the objects 111A and 111B through 111N are any objects that are identifiable such as toys, household goods, office wares, operational items, manufacturing materials, and any other objects, as discussed herein, or as known in the art at the time of filing, or as developed, or becomes available, after the time of filing.

As depicted in the embodiment of FIG. 1, the objects 111A and 111B through 111N include object housings 112A and 112B through 112N. It is to be understood that the object housings 112A and 112B through 112N are not limited to the graphics depicted in FIG. 1, as they are depicted for illustrative purposes. In one embodiment, the form of the object housings 112A and 112B through 112N are any object forms that are visually indistinguishable. For example, FIG. 1 depicts a first object housing 112A having a form of a toy car and a second object housing 112B also having a form of a toy car. In this example, the two toy cars may be of the same model type or may have the same body paint. It is to be understood that the first object housing 112A and the second object housing 112B may have imperceptible variations that are not perceivable by a normal human eye.

In contrast, in a traditional environment, a perceptible variation would be the application of a visible bar code to the roof of each toy car in which the visible bar code itself is traditionally black bars applied to a white background. Although such visible bar codes would make each object housing 112A and 112B through 112N uniquely identifiable, such would interfere with the aesthetic nature of each object housing 112A and 112B through 112N, causing each object 111A and 111B through 111N to be visually unappealing. For example, visible bar codes placed on the roofs of toy cars of a racing game would typically be a distraction from the playing experience for players of the game. It is to be understood that in some embodiments, the objects have perceptible variations, such as different body paint of a toy car or a different feature of a toy car body. In such examples, the perceptible variations are not a distraction.

As depicted in the embodiment of FIG. 1, the objects 111A and 111B through 111N include invisible light sources 113A and 113B through 113N. It is to be understood that the invisible light sources 113A and 113B through 113N are not limited to the graphics depicted in FIG. 1, as they are depicted for illustrative purposes. For example, the invisible light sources 113A and 113B through 113N may be attached internally to the object housings 112A and 112B through 112N, externally to the object housings 112A and 112B through 112N, or any other integral attachment, as discussed herein, or as known in the art at the time of filing, or as developed, or becomes available, after the time of filing.

Although FIG. 1 depicts the invisible light sources 113A and 113B through 113N beneath the object housings 112A and 112B through 112N, in one embodiment, the object housings 112A and 112B through 112N form cavities within which the invisible light sources 113A and 113B through 113N are housed. In one embodiment, the invisible light sources 113A and 113B through 113N emit light that conforms to the invisible light spectrum, as discussed herein, or as known in the art at the time of filing, or as developed, or becomes available, after the time of filing. In one embodiment, the invisible light sources 113A and 113B through 113N are light emitting diodes. In one embodiment, the invisible light sources 113A and 113B through 113N are lasers. In one embodiment, the invisible light sources 113A and 113B through 113N are semiconductor lasers.

As depicted in the embodiment of FIG. 1, the objects 111A and 111B through 111N include opaque substrates 116A and 116B through 116N. It is to be understood that the opaque substrates 116A and 116B through 116N are not limited to the graphics depicted in FIG. 1, as they are depicted for illustrative purposes. In one embodiment, the opaque substrates 116A and 116B through 116N may be attached to the object housings 112A and 112B through 112N. For example, the object housings 112A and 112B through 112N may have the form of toy cars without roofs and the opaque substrates 116A and 116B through 116N may have the form of roofs attached to the toy cars. In one embodiment, the opaque substrates 116A and 116B through 116N are moldable to form a three-dimensional substrate.

In one embodiment, the opaque substrates 116A and 116B through 116N are formed, at least in part, from material that is opaque to the invisible light emitted by the invisible light sources 113A and 113B through 113N. For example, if the invisible light sources 113A and 113B through 113N emit infrared light, then the opaque substrates 116A and 116B through 116N may be opaque to that infrared light, such that the emitted infrared light may not pass through the material of the opaque substrates 116A and 116B through 116N.

In one embodiment, the opaque substrates 116A and 116B through 116N are formed to each define an aperture design through which the emitted light of the invisible light sources 113A and 113B through 113N can pass. In one embodiment, each aperture design of the opaque substrates 116A and 116B through 116N is uniquely shaped. For example, an aperture design may be shaped as a puzzle piece of a jigsaw puzzle. It is to be understood that although the opaque substrates 116A and 116B through 116N are depicted as jigsaw puzzle pieces, such is for illustrative purposes. FIG. 1 depicts an embodiment of the opaque substrates 116A and 116B through 116N each having one or more apertures formed that create a unique aperture design, and the pictorial representations of FIG. 1 are not to be considered limiting. As depicted in FIG. 1 for illustrative purposes, the aperture design of a first opaque substrate 116A depicts a puzzle piece design having two protrusions and one indentation, the aperture design of a second opaque substrate 116B depicts a puzzle piece design having one protrusion and two indentations, and the aperture design of a third opaque substrate 116N depicts a puzzle piece design having two protrusions and two indentations.

As depicted in the embodiment of FIG. 1, invisible light 119A and 119B through 119N is emitted by the invisible light sources 113A and 113B through 113N, is received by the aperture designs formed by the opaque substrates 116A and 116B through 116N, and is formed into identification patterns based on those aperture designs. It is to be understood that the invisible light 119A and 119B through 119N are not limited to the graphics depicted in FIG. 1, as they are depicted for illustrative purposes. In one embodiment, the identification pattern of first invisible light 119A includes invisible light emission of two protrusions and one indentation, the identification pattern of second invisible light 119B includes invisible light emission of one protrusion and two indentations, and the identification pattern of third invisible light 119N includes invisible light emission of two protrusions and two indentations.

As depicted in the embodiment of FIG. 1, the invisible light 119A and 119B through 119N is not visible to a normal human eye 190. In one embodiment, although the invisible light 119A and 119B through 119N is emitted into the environment, it is not noticeable to users of the device 101 who are in the environment. For example, a digital reality game may be played with the objects 111A and 111B through 111N, and if the invisible light 119A and 119B through 119N is infrared light, then the infrared light is not visible to the players of the game and the players are not distracted by the infrared light as they play a digital reality game.

As depicted in the embodiment of FIG. 1, the invisible light 119 is received by the invisible light sensor 107 of the device 101. It is to be understood that the invisible light 119 being sensed by the invisible light sensor 107 is not limited to the graphic depicted in FIG. 1, as it is depicted for illustrative purposes. For example, the invisible light 119 may have originated from any one of the objects 111A and 111B through 111N as the emitted invisible light 119A and 119B through 119N, where each is formed with a respective identification pattern.

In one embodiment, the invisible light sensor 107 of the device 101 senses the invisible light 119A and 119B through 119N in parallel, sensing such at the same time. In one embodiment, the invisible light sensor 107 of the device 101 senses the invisible light 119A and 119B through 119N in serial, sensing such at different times. In one embodiment, the invisible light sensor 107 of the device 101 senses the invisible light 119A and 119B through 119N in any combination of parallel and serial sensing, such as when some light is sensed concurrently and other light is sensed non-concurrently. It is to be understood that, in some embodiments, the invisible light sensor 107 senses both invisible light and visible light. For example, an invisible light sensor 107 of a smartphone may be a camera that can sense both infrared light and visible light of an object.

Although not shown in FIG. 1, a device control circuit of the device 101 can detect the identification patterns of the invisible light 119A and 119B through 119N and determine unique identifiers based on the detected identification patterns. For example, a first identification pattern of the invisible light 119A may be determined by the device control circuit to be represented by the number "one," a second identification pattern of invisible light 119B may be determined by the device control circuit to be represented by the number "two," and a third identification pattern of invisible light 119N may be determined by the device control circuit to be represented by the number "three." In this example, the device 101 may determine unique identifiers respectively of numbers "one" and "two" for the two objects 111A and 111B based on the respective emitted invisible light 119A and 119B.

Figure 2:
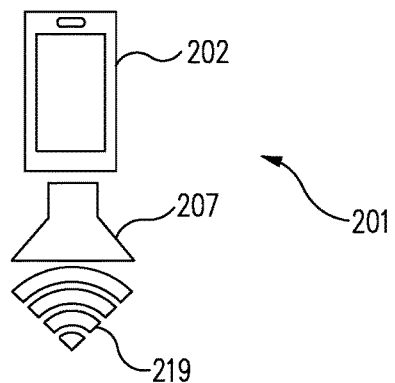
FIG. 2 is a pictorial diagram of a unique identifier detection system, in accordance with one embodiment.
Figure 2:
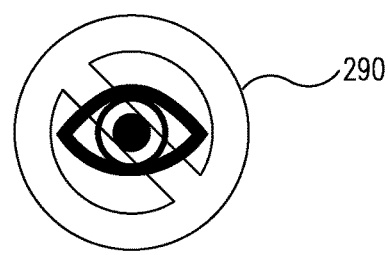
Figure 2:
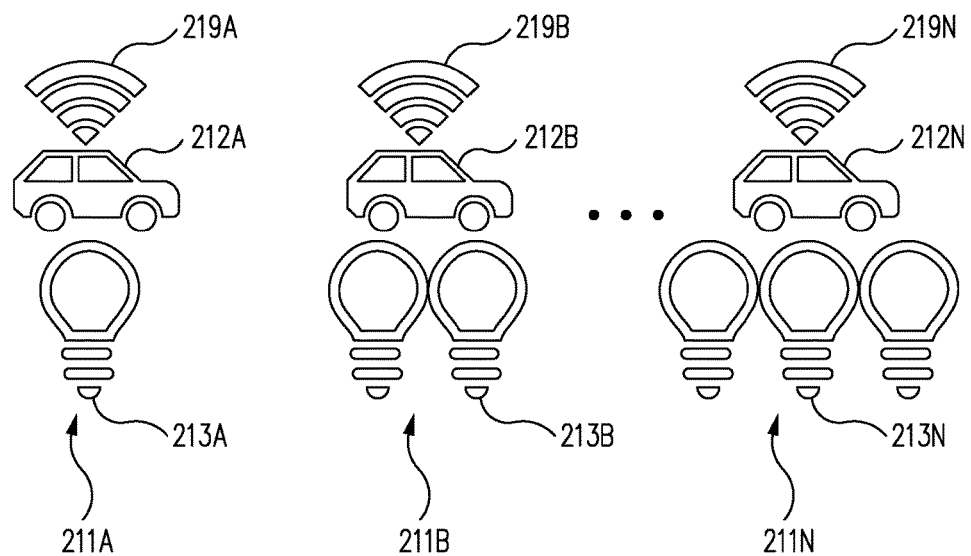

FIG. 2 is a pictorial diagram of a unique identifier detection system 200, in accordance with one embodiment. As depicted in the embodiment of FIG. 2, there is a device 201 that includes a device housing 202 and an invisible light sensor 207. It is to be understood that the device housing 202 is not limited to the graphic depicted in FIG. 2, as it is depicted for illustrative purposes. In one embodiment, the form of the device housing 202 is any invisible light detecting device housing, such as a camera, a smartphone, smart glasses, a headset, and any other invisible light detecting device housing, as discussed herein, or as known in the art at the time of filing, or as developed, or becomes available, after the time of filing. It is also to be understood that the invisible light sensor 207 is not limited to the graphic depicted in FIG. 2, as it is depicted for illustrative purposes. For example, the invisible light sensor 207 may be attached internally to the device housing 202, externally to the device housing 202, or any other integral attachment, as discussed herein, or as known in the art at the time of filing, or as developed, or becomes available, after the time of filing.

As depicted in the embodiment of FIG. 2, there is a plurality of objects 211A and 211B through 211N, and it is to be understood that there may be any number of such objects. In one embodiment, the objects 211A and 211B through 211N are any objects that are identifiable such as toys, household goods, office wares, operational items, manufacturing materials, and any other objects, as discussed herein, or as known in the art at the time of filing, or as developed, or becomes available, after the time of filing.

As depicted in the embodiment of FIG. 2, the objects 211A and 211B through 211N include object housings 212A and 212B through 212N. It is to be understood that the object housings 212A and 212B through 212N are not limited to the graphics depicted in FIG. 2, as they are depicted for illustrative purposes. In one embodiment, the form of the object housings 212A and 212B through 212N are any object forms that are visually indistinguishable. For example, FIG. 2 depicts a first object housing 212A having a form of a toy car and a second object housing 212B also having a form of a toy car. In this example, the two toy cars may be of the same model type or may have the same body paint. It is to be understood that the first object housing 212A and the second object housing 212B may have imperceptible variations that are not perceivable by a normal human eye.

In contrast, in a traditional environment, a perceptible variation would be the application of a visible bar code to the roof of each toy car in which the visible bar code itself is traditionally black bars applied to a white background. Although such visible bar codes would make each object housing 212A and 212B through 212N uniquely identifiable, such would interfere with the aesthetic nature of each object housing 212A and 212B through 212N, causing each object 211A and 211B through 211N to be visually unappealing. For example, visible bar codes placed on the roofs of toy cars of a racing game would typically be a distraction from the playing experience for players of the game. It is to be understood that in some embodiments, the objects have perceptible variations, such as different body paint of a toy car or a different feature of a toy car body. In such examples, the perceptible variations are not a distraction.

As depicted in the embodiment of FIG. 2, the objects 211A and 211B through 211N include invisible light emitters 213A and 213B through 213N. It is to be understood that the invisible light emitters 213A and 213B through 213N are not limited to the graphics depicted in FIG. 2, as they are depicted for illustrative purposes. For example, the invisible light emitters 213A and 213B through 213N may be attached internally to the object housings 212A and 212B through 212N, externally to the object housings 212A and 212B through 212N, or any other integral attachment, as discussed herein, or as known in the art at the time of filing, or as developed, or becomes available, after the time of filing.

Although FIG. 2 depicts the invisible light emitters 213A and 213B through 213N beneath the object housings 212A and 212B through 212N, in one embodiment, the object housings 212A and 212B through 212N form cavities within which the invisible light emitters 213A and 213B through 213N are housed. In one embodiment, the invisible light emitters 213A and 213B through 213N emit light that conforms to the invisible light spectrum, as discussed herein, or as known in the art at the time of filing, or as developed, or becomes available, after the time of filing. In one embodiment, the invisible light emitters 213A and 213B through 213N are light emitting diodes. In one embodiment, the invisible light emitters 213A and 213B through 213N are lasers. In one embodiment, the invisible light emitters 213A and 213B through 213N are semiconductor lasers.

It is to be understood that although the invisible light emitters 213A and 213B through 213N are depicted as light sources, such is for illustrative purposes. FIG. 2 depicts an embodiment of the invisible light emitters 213A and 213B through 213N each having one or more light sources that emit light in a unique identification pattern, and the pictorial representations of FIG. 2 are not to be considered limiting. As depicted in FIG. 2 for illustrative purposes, the invisible light emitters 213A depict one light source, the invisible light emitters 213B depict two light sources, and the invisible light emitters 213N depict three light sources, which illustrates that each of the invisible light emitters 213A and 213 B through 213 N has a different invisible light emitting pattern. In one embodiment, an identification pattern corresponds to a number of emitters. In one embodiment, an identification pattern corresponds to the respective position of each of the emitters. In one embodiment, an identification pattern corresponds to the number of emitters and their respective positions. In one embodiment, an identification pattern corresponds to the activation of a number of emitters.

Although not depicted in the embodiment of FIG. 2, the objects 211A and 211B through 211N may include opaque substrates. In one embodiment, the opaque substrates may be attached to the object housings 212A and 212B through 212N. For example, the object housings 212A and 212B through 212N may have the form of toy cars without roofs and the opaque substrates may have the form of roofs attached to the toy cars. In one embodiment, the opaque substrates are moldable to form a three-dimensional substrate.

In one embodiment, the opaque substrates are formed, at least in part, from material that is opaque to the invisible light emitted by the invisible light emitters 213A and 213B through 213N. For example, if the invisible light emitters 213A and 213B through 213N emit infrared light, then the opaque substrates may be opaque to that infrared light, such that the emitted infrared light may not pass through the material of the opaque substrates. In one embodiment, the opaque substrates are formed to each define pattern apertures through which the emitted light of the invisible light emitters 213A and 213B through 213N can pass. In one embodiment, there is one defined pattern aperture for each emitter.

As depicted in the embodiment of FIG. 2, invisible light 219A and 219B through 219N is emitted by the invisible light emitters 213A and 213B through 213N having corresponding identification patterns based on the number and position of the invisible light emitters 213A and 213B through 213N. It is to be understood that the invisible light 219A and 219B through 219N are not limited to the graphics depicted in FIG. 2, as they are depicted for illustrative purposes. In one embodiment, the identification pattern of first invisible light 219A includes invisible light emission from one light source, the identification pattern of second invisible light 219B includes invisible light emission from two light sources, and the identification pattern of third invisible light 219N includes invisible light emission from three light sources.

As depicted in the embodiment of FIG. 2, the invisible light 219A and 219B through 219N is not visible to a normal human eye 290. In one embodiment, although the invisible light 219A and 219B through 219N is emitted into the environment, it is not noticeable to users of the device 201 who are in the environment. For example, a digital reality game may be played with the objects 211A and 211B through 211N, and if the invisible light 219A and 219B through 219N is infrared light, then the infrared light is not visible to the players of the game and the players are not distracted by the infrared light as they play a digital reality game.

As depicted in the embodiment of FIG. 2, the invisible light 219 is received by the invisible light sensor 207 of the device 201. It is to be understood that the invisible light 219 being sensed by the invisible light sensor 207 is not limited to the graphic depicted in FIG. 2, as it is depicted for illustrative purposes. For example, the invisible light 219 may have originated from any one of the objects 211A and 211B through 211N as the emitted invisible light 219A and 219B through 219N, where each is formed with a respective identification pattern.

In one embodiment, the invisible light sensor 207 of the device 201 senses the invisible light 219A and 219B through 219N in parallel, sensing such at the same time. In one embodiment, the invisible light sensor 207 of the device 201 senses the invisible light 219A and 219B through 219N in serial, sensing such at different times. In one embodiment, the invisible light sensor 207 of the device 201 senses the invisible light 219A and 219B through 219N in any combination of parallel and serial sensing, such as when some light is sensed concurrently and other light is sensed nonconcurrently. It is to be understood that, in some embodiments, the invisible light sensor 207 senses both invisible light and visible light. For example, an invisible light sensor 207 of a smartphone may be a camera that can sense both infrared light and visible light of an object.

Although not shown in FIG. 2, a device control circuit of the device 201 can detect the identification patterns of the invisible light 219A and 219B through 219N and determine unique identifiers based on the detected identification patterns. For example, a first identification pattern of the invisible light 219A may be determined by the device control circuit to be represented by the number "one," a second identification pattern of invisible light 219B may be determined by the device control circuit to be represented by the number "two," and a third identification pattern of invisible light 219N may be determined by the device control circuit to be represented by the number "three." In this example, the device 201 may determine unique identifiers respectively of numbers "one" and "two" for the two objects 211A and 211B based on the respective emitted invisible light 219A and 219B.

Embodiments of the present disclosure provide highly efficient, effective, and versatile systems and methods for uniquely identifying objects that are visually indistinguishable. However, the disclosed embodiments do not encompass, embody, or preclude other forms of innovation in the area of object identification systems and methods.

In addition, the disclosed embodiments of systems and methods for uniquely identifying tangible objects that are visually indistinguishable are not abstract ideas for at least several reasons.

First, the disclosed systems and methods for uniquely identifying tangible objects that are visually indistinguishable are not abstract ideas because they are not merely an idea itself (e.g., can be performed mentally or using pen and paper). For example, it is not possible for the human eye to see invisible light that is in a light spectrum that the human eye cannot detect. Accordingly, the human mind cannot comprehend the identification pattern of the invisible light, even with pen and paper to assist the human mind. In contrast, the disclosed embodiments utilize an invisible light sensor to sense invisible light having an identification pattern that was emitted from an object and to uniquely identify the object based on the sensed invisible light.

Second, the disclosed systems and methods for uniquely identifying tangible objects that are visually indistinguishable are not abstract ideas because they are not a fundamental economic practice (e.g., are not merely creating a contractual relationship, hedging, mitigating a settlement risk, etc.). In contrast, the disclosed embodiments provide for determining a unique identifier based on an identification pattern of invisible light sensed by an invisible light sensor, which provides an improved experience for users of a device interacting with a plurality of objects.

Third, the disclosed systems and methods for uniquely identifying tangible objects that are visually indistinguishable are not abstract ideas because they are not a method of organizing human activity (e.g., managing a game of bingo), but are rather, in one embodiment, tools for enabling the detection of visually indistinguishable objects that may be utilized by human activity. For example, if the human activity is a racing game, and the objects being utilized are toy cars that emit invisible light having identification patterns of the respective toy cars, the racing game is enhanced. That enhancement is independent of a method for organizing the human activity of a racing game.

Fourth, although mathematics may be used in the disclosed systems and methods for uniquely identifying tangible objects that are visually indistinguishable, the disclosed and claimed systems and methods are not abstract ideas because they are not simply a mathematical relationship/formula. In contrast, the disclosed embodiments provide for determining a unique identifier from an identification pattern of emitted invisible light. This results in the tangible effect of the identification of visually indistinguishable objects that exist in the physical environment of a user of an invisible light sensing device.

Exemplary Environment

Figure 3:
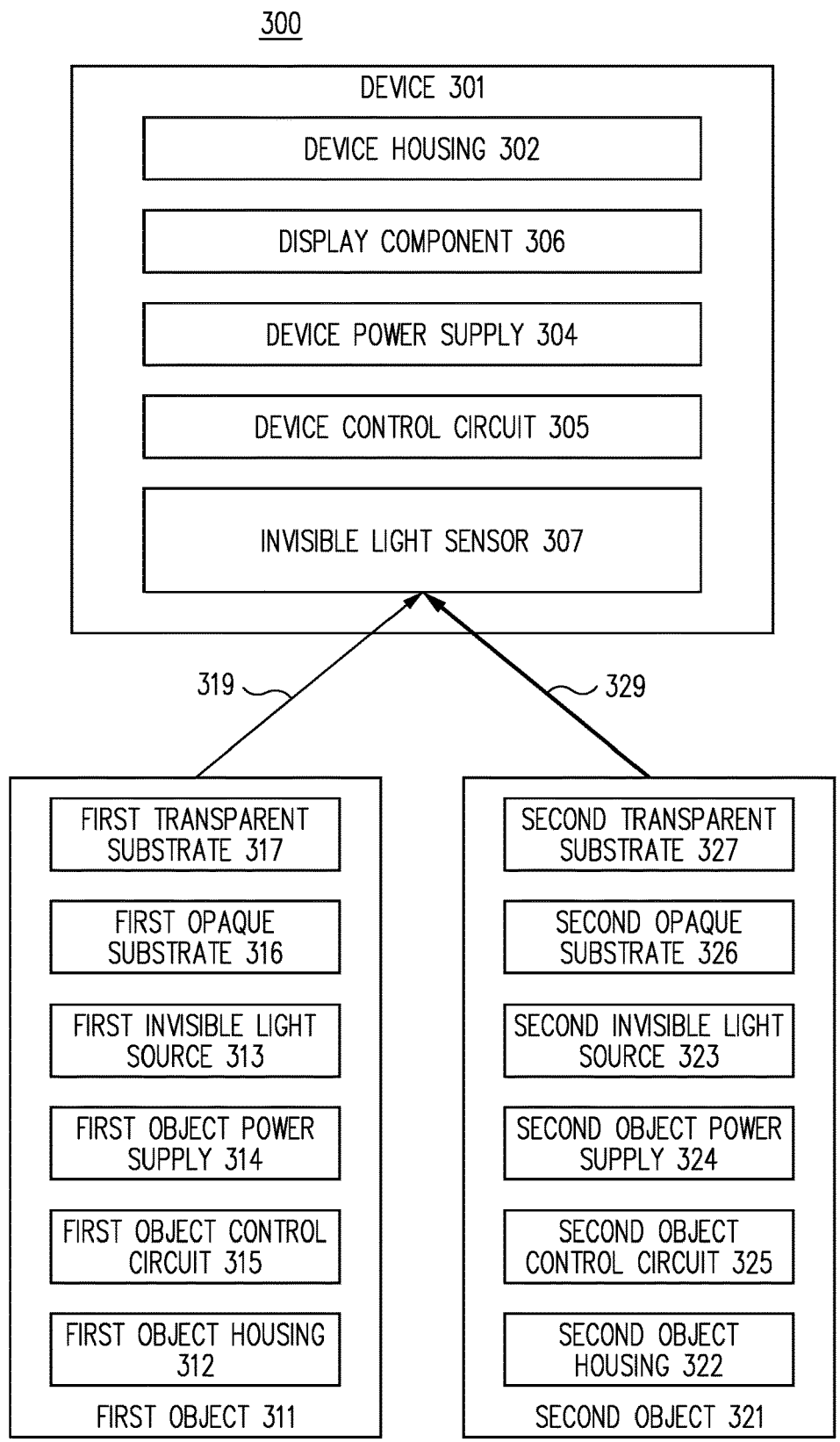
FIG. 3 is a block diagram of a unique identifier detection system, in accordance with one embodiment.

FIG. 3 is a functional block diagram of a unique identifier detection system 300, in accordance with one embodiment. It is to be understood that certain elements of FIG. 1 correspond to respective elements of FIG. 3 and may be used interchangeably when referring to FIGS. 1 and 3. Referring to FIGS. 1 and 3 together, the object 111A of FIG. 1 corresponds to the first object 311 of FIG. 3, the object 111B of FIG. 1 corresponds to the second object 321 of FIG. 3, and the device 101 of FIG. 1 corresponds to the device 301 of FIG. 3. It is to be understood that, although only a first object 311 and a second object 321 are depicted in FIG. 3, collectively they correspond to the plurality of objects 111A and 111B through 111N of FIG. 1. It is to be understood that although a Nth object is not depicted in FIG. 3, as it is in FIG. 1, the first object 311 and the second object 321 can collectively represent any number of objects, such as any number of objects that are visually indistinguishable.

Referring to FIG. 3, the unique identifier detection system 300 includes a device 301, a first object 311, and a second object 321. In one embodiment, the first object 311 includes a first object housing 312. For example, the first object housing 312 may be considered the body of the first object 311. In one embodiment, a first invisible light source 313 is coupled to the first object housing 312. For example, a first object housing 312 may be a toy car without an engine hood, and the first invisible light source 313 may reside in the engine compartment of the toy car, where an actual engine would reside in an actual car. In one embodiment, the first object housing 312 is opaque to the invisible light emitted by the first invisible light source 313.

In one embodiment, the first object 311 includes a first object power supply 314 that is coupled to the first object housing 312. In one embodiment, the first object power supply 314 is electronically coupled to the first invisible light source 313 to activate the first invisible light source 313 to emit invisible light.

In one embodiment, the first object 311 includes a first object control circuit 315 coupled to the first object housing 312. In one embodiment, the first object control circuit 315 is electronically coupled to the first object power supply 314 and electronically coupled to the first invisible light source 313. In one embodiment, the first object control circuit 315 activates the first invisible light source 313 to emit invisible light.

In one embodiment, the first object 311 includes a first opaque substrate 316 that is coupled to the first object housing 312. In one embodiment, the first opaque substrate 316 is made from a material that is opaque to the invisible light emitted by the first invisible light source 313. In one embodiment, the first opaque substrate 316 forms an enclosure within which the first invisible light source 313 resides. In one embodiment, the first opaque substrate 316 coupled with the first object housing 312 collectively form an enclosure within which the first invisible light source 313 resides.

For example, a first object housing 312 may be a toy car without an engine hood, and the first invisible light source 313 may be housed in the engine compartment of the toy car, where an actual engine would be housed in an actual car. In this example, the first object housing 312 and the first opaque substrate 316 are opaque to the invisible light emitted by the first invisible light source 313. In this example, the first opaque substrate 316 is shaped to be an engine hood that is compatible to the first object housing 312, and the first opaque substrate 316 is coupled to the first object housing 312 to form an enclosure resembling an engine compartment in which the first invisible light source 313 resides. In this example, when the first invisible light source 313 is activated, such as when the first invisible light source 313 is activated by the first object control circuit 315 supplying power from the first object power supply 314, the emitted invisible light emitted from the first invisible light source 313 cannot penetrate the opaque materials of the first opaque substrate 316 and the first object housing 312.

It is to be understood that the example of placing the first invisible light source 313 in the engine compartment of the first object 311 shaped as a toy car is not to be limiting, and that any placement of the first invisible light source 313 can be placed in any enclosure formed by the first object 311. For example, if the first object 311 is a toy car, the first object housing 312 may be the chassis of the toy car to which the first invisible light source 313 is attached. In this example, the first opaque substrate 316 may be the body of the toy car that forms an enclosure for the first invisible light source 313 that is attached to the chassis of the toy car, such as within the enclosure of the passenger compartment of the toy car.

In one embodiment, the first opaque substrate 316 includes at least one aperture defined by the first opaque substrate 316. For example, an aperture may be defined by the first opaque substrate 316 by removing opaque material from the first opaque substrate 316, such as by cutting away opaque material. In one embodiment, invisible light emitted by the first invisible light source 313 passes through at least one aperture formed by the first opaque substrate 316. In one embodiment, at least one aperture formed by the first opaque substrate 316 receives the emitted invisible light from the first invisible light source 313 and forms an identification pattern.

In one embodiment, the first object 311 includes a first transparent substrate 317 that is coupled to the first opaque substrate 316. In one embodiment, the first transparent substrate 317 is made from, at least in part, a material that is transparent to the invisible light emitted by the first invisible light source 313. In one embodiment, the first transparent substrate 317 maintains the integrity of the first opaque substrate 316, such as by providing a stiffening layer over the first opaque substrate 316. In one embodiment, the first transparent substrate 317 forms a protective layer over at least one aperture formed by the first opaque substrate 316. For example, if the first opaque substrate 316 is an engine hood of a toy car, the first transparent substrate 317 over at least one aperture provides for transparent paint to be applied to the first transparent substrate 317 so that any aperture is not visible to a normal human eye, where the transparent paint is transparent to the invisible light emitted by the first invisible light source 313.

In one embodiment, the first invisible light 319 formed with the identification pattern is emitted from the first object 311 and received by the device 301. It is to be understood that the first invisible light 319 being emitted by the first invisible light source 313 is not limited to the graphic depicted in FIG. 3, as it is depicted for illustrative purposes. For example, FIG. 3 depicts the first invisible light 319 comprising a thin ray of invisible light emission that may have been emitted by an invisible light emitter and received by a small aperture.

In one embodiment, the second object 321 is visually indistinguishable from the first object 311. In one embodiment, the second object 321 has imperceptible variations from the first object 311. For example, if the first object 311 is a toy car, then the second object 321 may also be a toy car that looks similar to the first object 311. In one embodiment, the second object 321 has corresponding characteristics as the first object 311 described herein. In one embodiment, the second object 321 includes a second object housing 322 having corresponding characteristics as the first object housing 312 described herein. In one embodiment, the second object 321 includes a second object power supply 324 having corresponding characteristics as the first object power supply 314 described herein. In one embodiment, the second object 321 includes a second object control circuit 325 having corresponding characteristics as the first object control circuit 315 described herein. In one embodiment, the second object 321 includes a second invisible light source 323 having corresponding characteristics as the first invisible light source 313 described herein. In one embodiment, the second object 321 includes a second opaque substrate 326 having corresponding characteristics as the first opaque substrate 316 described herein, except that, in one embodiment, at least one aperture formed by the second opaque substrate 326 forms a different identification pattern of invisible light than the identification pattern of invisible light formed by at least one aperture formed by the first opaque substrate 316. In one embodiment, the second object 321 includes a second transparent substrate 327 having corresponding characteristics as the first transparent substrate 317 described herein.

In one embodiment, the second object 321 emits second invisible light 329 having corresponding characteristics as the first invisible light 319 emitted by the first object 311 described herein, except, in one embodiment, the identification pattern of the second invisible light 329 is distinct from the identification pattern of the first invisible light 319. It is to be understood that the second invisible light 329 being emitted by the second invisible light source 323 is not limited to the graphic depicted in FIG. 3, as it is depicted for illustrative purposes. For example, FIG. 3 depicts the second invisible light 329 as comprising a thick ray of invisible light emission that may have been emitted by an invisible light emitter and received by a large aperture.

In one embodiment, the device 301 includes a device housing 302. In one embodiment, the device 301 includes an invisible light sensor 307. In one embodiment, the invisible light sensor 307 senses the first invisible light 319 emitted from the first object 311. In one embodiment, the invisible light sensor 307 senses the second invisible light 329 emitted from the second object 321. In one embodiment, the invisible light sensor 307 senses the first invisible light 319 and the second invisible light 329 at the same time. In one embodiment, the invisible light sensor 307 senses the first invisible light 319 and the second invisible light 329 at different times.

In one embodiment, the device 301 includes a device control circuit 305. In one embodiment, the device control circuit 305 is coupled to the device housing 302. In one embodiment, the device control circuit 305 is electronically coupled to the invisible light sensor 307. In one embodiment, the device control circuit 305 detects the first identification pattern of the first invisible light 319 sensed by the invisible light sensor 307. In one embodiment, the device control circuit 305 determines a first unique identifier for the first object 311. In one embodiment, the first unique identifier of the first object 311 is based on the first identification pattern of the first invisible light 319. For example, the first identification pattern may be a first quick response code and the first unique identifier may be a first serial number based on the first quick response code.

In one embodiment, the device control circuit 305 detects the second identification pattern of the second invisible light 329 sensed by the invisible light sensor 307. In one embodiment, the device control circuit 305 determines a second unique identifier for the second object 321. In one embodiment, the second unique identifier of the second object 321 is based on the second identification pattern of the second invisible light 329. For example, the second identification pattern may be a second quick response code and the second unique identifier may be a second serial number based on the second quick response code.

In one embodiment, the device 301 includes a device power supply 304. In one embodiment, the device power supply 304 is coupled to the device housing 302. In one embodiment, the device power supply 304 is electronically coupled to the invisible light sensor 307. In one embodiment, the device power supply 304 is electronically coupled to the device control circuit 305. In one embodiment, the device control circuit 305 supplies power to the invisible light sensor 307 from the device power supply 304.

In one embodiment, the device 301 includes a display component 306. In one embodiment, the display component 306 is coupled to the device housing 302. In one embodiment, the display component 306 is electronically coupled to the device power supply 304. In one embodiment, the display component 306 is electronically coupled to the device control circuit 305. In one embodiment, the display component 306 displays a first unique identifier of the first object 311 determined by the device control circuit 305. In one embodiment, the display component 306 displays a second unique identifier of the second object 321 determined by the device control circuit 305.

Figure 4:
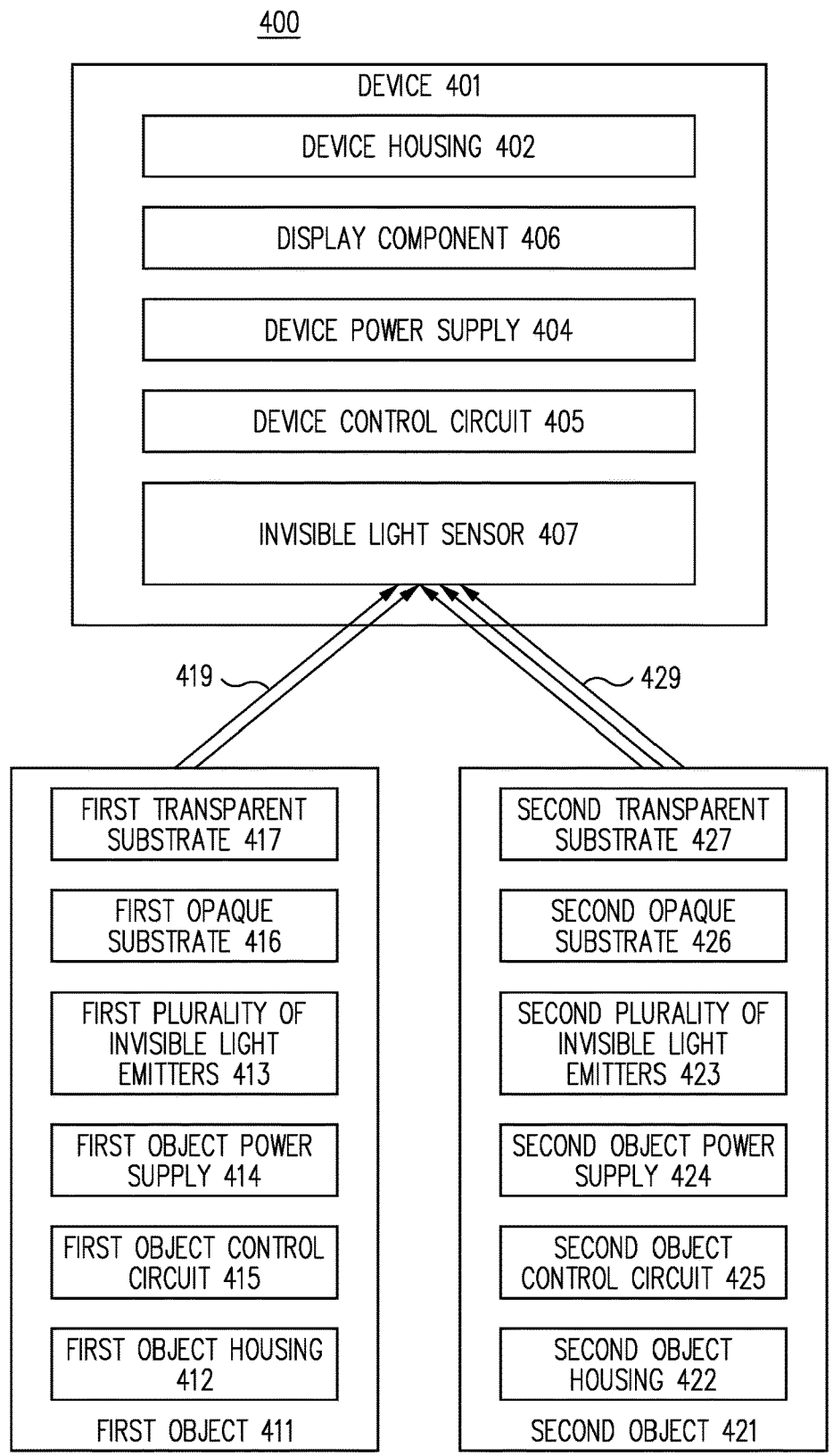
FIG. 4 is a block diagram of a unique identifier detection system, in accordance with one embodiment.

FIG. 4 is a functional block diagram of a unique identifier detection system 400, in accordance with one embodiment. It is to be understood that certain elements of FIG. 2 correspond to respective elements of FIG. 4 and may be used interchangeably when referring to FIGS. 2 and 4. Referring to FIGS. 2 and 4 together, the object 211A of FIG. 2 corresponds to the first object 411 of FIG. 4, the object 211B of FIG. 2 corresponds to the second object 421 of FIG. 4, and the device 201 of FIG. 2 corresponds to the device 401 of FIG. 4. It is to be understood that, although only a first object 411 and a second object 421 are depicted in FIG. 4, collectively they correspond to the plurality of objects 211A and 211B through 211N of FIG. 2. It is to be understood that although a Nth object is not depicted in FIG. 4, as it is in FIG. 2, the first object 411 and the second object 421 can collectively represent any number of objects, such as any number of objects that are visually indistinguishable.

Referring to FIG. 4, the unique identifier detection system 400 includes a device 401, a first object 411, and a second object 421. In one embodiment, the first object 411 includes a first object housing 412. For example, the first object housing 412 may be considered the body of the first object 411. In one embodiment, a first plurality of invisible light emitters 413 is coupled to the first object housing 412. For example, a first object housing 412 may be a toy car without an engine hood, and the first plurality of invisible light emitters 413 may reside in the engine compartment of the toy car, where an actual engine would reside in an actual car. In one embodiment, the first object housing 412 is opaque to the invisible light emitted by the first plurality of invisible light emitters 413. In one embodiment, a first identification pattern is formed by a number of the first plurality of invisible light emitters 413 each having a position in relation to the others. For example, a first identification pattern may be formed by three invisible light emitters of the first plurality of invisible light emitters 413 being positioned as a row. For further example, a first identification pattern may be formed by three invisible light emitters of the first plurality of invisible light emitters 413 being positioned as a triangle.

In one embodiment, the first object 411 includes a first object power supply 414 that is coupled to the first object housing 412. In one embodiment, the first object power supply 414 is electronically coupled to the first plurality of invisible light emitters 413 to activate at least a portion of the first plurality of invisible light emitters 413 to emit invisible light.

In one embodiment, the first object 411 includes a first object control circuit 415 coupled to the first object housing 412. In one embodiment, the first object control circuit 415 is electronically coupled to the first object power supply 414 and electronically coupled to the first plurality of invisible light emitters 413. In one embodiment, the first object control circuit 415 activates at least a portion of the first plurality of invisible light emitters 413 to emit invisible light. For example, if the first plurality of invisible light emitters 413 includes four emitters, the first object control circuit 415 may activate three of those four emitters.

In one embodiment, the first object 411 includes a first opaque substrate 416 that is coupled to the first object housing 412. In one embodiment, the first opaque substrate 416 is made from a material that is opaque to the invisible light emitted by the first plurality of invisible light emitters 413. In one embodiment, the first opaque substrate 416 forms an enclosure within which the first plurality of invisible light emitters 413 resides. In one embodiment, the first opaque substrate 416 coupled with the first object housing 412 collectively form an enclosure within which the first plurality of invisible light emitters 413 resides.

For example, a first object housing 412 may be a toy car without an engine hood, and the first plurality of invisible light emitters 413 may be housed in the engine compartment of the toy car, where an actual engine would be housed in an actual car. In this example, the first object housing 412 and the first opaque substrate 416 are opaque to the invisible light emitted by the first plurality of invisible light emitters 413. In this example, the first opaque substrate 416 is shaped to be an engine hood that is compatible to the first object housing 412, and the first opaque substrate 416 is coupled to the first object housing 412 to form an enclosure resembling an engine compartment in which the first plurality of invisible light emitters 413 resides. In this example, when at least a portion of the first plurality of invisible light emitters 413 is activated, such as when one of the first plurality of invisible light emitters 413 is activated by the first object control circuit 415 supplying power from the first object power supply 414, the emitted invisible light emitted from the first plurality of invisible light emitters 413 cannot penetrate the opaque materials of the first opaque substrate 416 and the first object housing 412.

It is to be understood that the example of placing the first plurality of invisible light emitters 413 in the engine compartment of the first object 411 shaped as a toy car is not to be limiting, and that any placement of the first plurality of invisible light emitters 413 can be placed in any enclosure formed by the first object 411. For example, if the first object 411 is a toy car, the first object housing 412 may be the chassis of the toy car to which the first plurality of invisible light emitters 413 is attached. In this example, the first opaque substrate 416 may be the body of the toy car that forms an enclosure for the first plurality of invisible light emitters 413 that is attached to the chassis of the toy car, such as within the enclosure of the passenger compartment of the toy car.

In one embodiment, the first opaque substrate 416 includes a first plurality of pattern apertures defined by the first opaque substrate 416. For example, an aperture may be defined by the first opaque substrate 416 by removing opaque material from the first opaque substrate 416, such as by cutting away opaque material. In one embodiment, invisible light emitted by a respective one of the first plurality of invisible light emitters 413 passes through a respective one of the first plurality of pattern apertures defined by the first opaque substrate 416. In one embodiment, at least one aperture formed by the first opaque substrate 416 receives the emitted invisible light from a respective one of the first plurality of invisible light emitters 413.

In one embodiment, the first object 411 includes a first transparent substrate 417 that is coupled to the first opaque substrate 416. In one embodiment, the first transparent substrate 417 is made from, at least in part, a material that is transparent to the invisible light emitted by the first plurality of invisible light emitters 413. In one embodiment, the first transparent substrate 417 maintains the integrity of the first opaque substrate 416, such as by providing a stiffening layer over the first opaque substrate 416. In one embodiment, the first transparent substrate 417 forms a protective layer over at least one aperture formed by the first opaque substrate 416. For example, if the first opaque substrate 416 is an engine hood of a toy car, the first transparent substrate 417 over at least one aperture provides for transparent paint to be applied to the first transparent substrate 417 so that any aperture is not visible to a normal human eye, where the transparent paint is transparent to the invisible light emitted by the first plurality of invisible light emitters 413.

In one embodiment, the first invisible light 419 formed with the identification pattern is emitted from the first object 411 and received by the device 401. It is to be understood that the first invisible light 419 being emitted by the first plurality of invisible light emitters 413 is not limited to the graphic depicted in FIG. 4, as it is depicted for illustrative purposes. For example, FIG. 4 depicts the first invisible light 419 comprising two rays of invisible light emission that may have been emitted by two invisible light emitters.

In one embodiment, the second object 421 is visually indistinguishable from the first object 411. In one embodiment, the second object 421 has imperceptible variations from the first object 411. For example, if the first object 411 is a toy car, then the second object 421 may also be a toy car that looks similar to the first object 411. In one embodiment, the second object 421 has corresponding characteristics as the first object 411 described herein. In one embodiment, the second object 421 includes a second object housing 422 having corresponding characteristics as the first object housing 412 described herein. In one embodiment, the second object 421 includes a second object power supply 424 having corresponding characteristics as the first object power supply 414 described herein. In one embodiment, the second object 421 includes a second object control circuit 425 having corresponding characteristics as the first object control circuit 415 described herein. In one embodiment, the second object 421 includes a second plurality of invisible light emitters 423 having corresponding characteristics as the first plurality of invisible light emitters 413 described herein, except that, in one embodiment, the second plurality of invisible light emitters 423 have different invisible light emittance and/or different placement than the first plurality of invisible light emitters 413. In one embodiment, the second object 421 includes a second opaque substrate 426 having corresponding characteristics as the first opaque substrate 416 described herein. In one embodiment, the second object 421 includes a second transparent substrate 427 having corresponding characteristics as the first transparent substrate 417 described herein.

In one embodiment, the second object 421 emits second invisible light 429 having corresponding characteristics as the first invisible light 419 emitted by the first object 411 described herein, except, in one embodiment, the identification pattern of the second invisible light 429 is distinct from the identification pattern of the first invisible light 419. It is to be understood that the second invisible light 429 being emitted by the second plurality of invisible light emitters 423 is not limited to the graphic depicted in FIG. 4, as it is depicted for illustrative purposes. For example, FIG. 4 depicts the second invisible light 429 as comprising three rays of invisible light emission that may have been emitted by three invisible light emitters.

In one embodiment, the device 401 includes a device housing 402. In one embodiment, the device 401 includes an invisible light sensor 407. In one embodiment, the invisible light sensor 407 senses the first invisible light 419 emitted from the first object 411. In one embodiment, the invisible light sensor 407 senses the second invisible light 429 emitted from the second object 421. In one embodiment, the invisible light sensor 407 senses the first invisible light 419 and the second invisible light 429 at the same time. In one embodiment, the invisible light sensor 407 senses the first invisible light 419 and the second invisible light 429 at different times.

In one embodiment, the device 401 includes a device control circuit 405. In one embodiment, the device control circuit 405 is coupled to the device housing 402. In one embodiment, the device control circuit 405 is electronically coupled to the invisible light sensor 407. In one embodiment, the device control circuit 405 detects the first identification pattern of the first invisible light 419 sensed by the invisible light sensor 407. In one embodiment, the device control circuit 405 determines a first unique identifier for the first object 411. In one embodiment, the first unique identifier of the first object 411 is based on the first identification pattern of the first invisible light 419. For example, the first identification pattern may be invisible light emission from a first number of first invisible light emitters 413 each having a certain position in relation to the others, and the first unique identifier may be a first serial number based on the number, respective activation, and respective position of the first plurality of invisible light emitters 413.

In one embodiment, the device control circuit 405 detects the second identification pattern of the second invisible light 429 sensed by the invisible light sensor 407. In one embodiment, the device control circuit 405 determines a second unique identifier for the second object 421. In one embodiment, the second unique identifier of the second object 421 is based on the second identification pattern of the second invisible light 429. For example, the second identification pattern may be invisible light emission from a second number of second invisible light emitters 423 each having a certain position in relation to the others, and the second unique identifier may be a second serial number based on the number, respective activation, and respective position of the second plurality of invisible light emitters 423.

In one embodiment, the device 401 includes a device power supply 404. In one embodiment, the device power supply 404 is coupled to the device housing 402. In one embodiment, the device power supply 404 is electronically coupled to the invisible light sensor 407. In one embodiment, the device power supply 404 is electronically coupled to the device control circuit 405. In one embodiment, the device control circuit 405 supplies power to the invisible light sensor 407 from the device power supply 404.

In one embodiment, the device 401 includes a display component 406. In one embodiment, the display component 406 is coupled to the device housing 402. In one embodiment, the display component 406 is electronically coupled to the device power supply 404. In one embodiment, the display component 406 is electronically coupled to the device control circuit 405. In one embodiment, the display component 406 displays a first unique identifier of the first object 411 determined by the device control circuit 405. In one embodiment, the display component 406 displays a second unique identifier of the second object 421 determined by the device control circuit 405.

Figure 5:
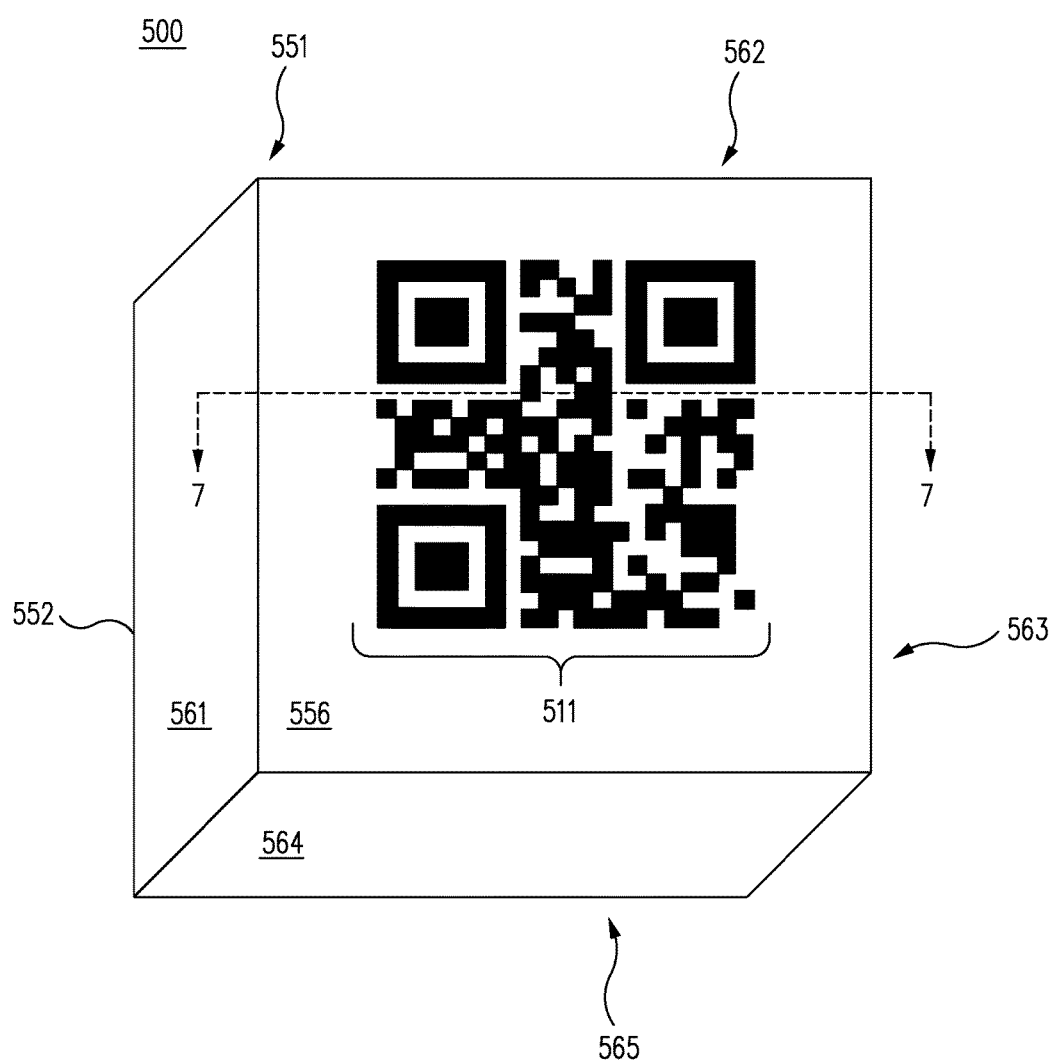
FIG. 5 illustrates an example perspective view of an example object of a unique identifier detection system, in accordance with one embodiment.

FIG. 5 illustrates an example perspective view of an example object 551 of a unique identifier detection system 500, in accordance with one embodiment. Referring to FIGS. 1 and 5 together, the example object 551 may be any of the objects 111A and 111B through 111N of FIG. 1. Referring to FIGS. 3 and 5 together, the example object 551 may be any of the first object 311 and the second object 321.

As illustrated in FIG. 5, the object 551 has an object housing 552 and an opaque substrate 556. In one embodiment, the opaque substrate 556 is coupled to the object housing 552 to define an enclosure in which an invisible light source (not shown) is housed. In one embodiment, the object housing 552 has a base wall 565 opposed to the opaque substrate 556. Although not shown in FIG. 5, in one embodiment, one or more components may be coupled to the base wall 565, such as an invisible light source, an object control circuit, and an object power supply.

In one embodiment, the object housing 552 includes one or more side walls extending between the base wall 565 and the opaque substrate 556. As illustrated in FIG. 5, the object housing 552 includes a first side wall 561, a second side wall 562 adjacent to the first side wall 561, a third side wall 563 adjacent to the second side wall 562 and opposed to the first side wall 561, and a fourth side wall 564 adjacent to the third side wall 563, adjacent to the first side wall 561, and opposed to the second side wall 562.

It is to be understood that although the object housing 552 illustrated in FIG. 5 has a cube shape, the shape illustrated in FIG. 5 is not meant to be limiting. Under some embodiments, an object housing 552 has a two-dimensional shape, a three-dimensional shape, and any other housing shape, as discussed herein, or as known in the art at the time of filing, or as developed, or becomes available, after the time of filing. It is to be further understood that although the opaque substrate 556 illustrated in FIG. 5 has a flat shape, the shape illustrated in FIG. 5 is not meant to be limiting. Under some embodiments, an opaque substrate 556 has a two-dimensional shape, a three-dimensional shape, and any other substrate shape, as discussed herein, or as known in the art at the time of filing, or as developed, or becomes available, after the time of filing. Although not illustrated in FIG. 5, the object 551 may include a transparent substrate coupled to the opaque substrate 556.

In one embodiment, the opaque substrate 556 includes an aperture design 511 designed from the opaque substrate 556. As illustrated in FIG. 5, the aperture design 511 is a quick response (QR) code formed from at least one aperture. It is to be understood that although the aperture design 511 is illustrated in FIG. 5 as a QR code design, the aperture design 511 illustrated in FIG. 5 is not meant to be limiting. In some embodiments, the aperture design 511 may have a bar code design, a braille design, and any aperture design, as discussed herein, or as known in the art at the time of filing, or as developed, or becomes available, after the time of filing.

In one embodiment, the aperture design 511 receives invisible light emitted by an invisible light source housed in an enclosure of the object 551, and the invisible light is formed by the aperture design 511 to have an identification pattern unique to the object 551 in relation to other objects of the system. For example, if two car toys are used in a racing game, and the cars are visually similar, a first car may have a first aperture design of one aperture through which emitted first invisible light would shine to form a first identification pattern of one beam of invisible light. In this example, a second toy car may have a second aperture design of two apertures through which emitted second invisible light would shine to form a second identification pattern of two beams of invisible light. In this example, a device can identify the first toy car by sensing the first invisible light comprising the one beam of invisible light and detecting the first identification pattern, and the device can identify the second toy car by sensing the second invisible light comprising the two beams of invisible light and detecting the second identification pattern.

Figure 6:
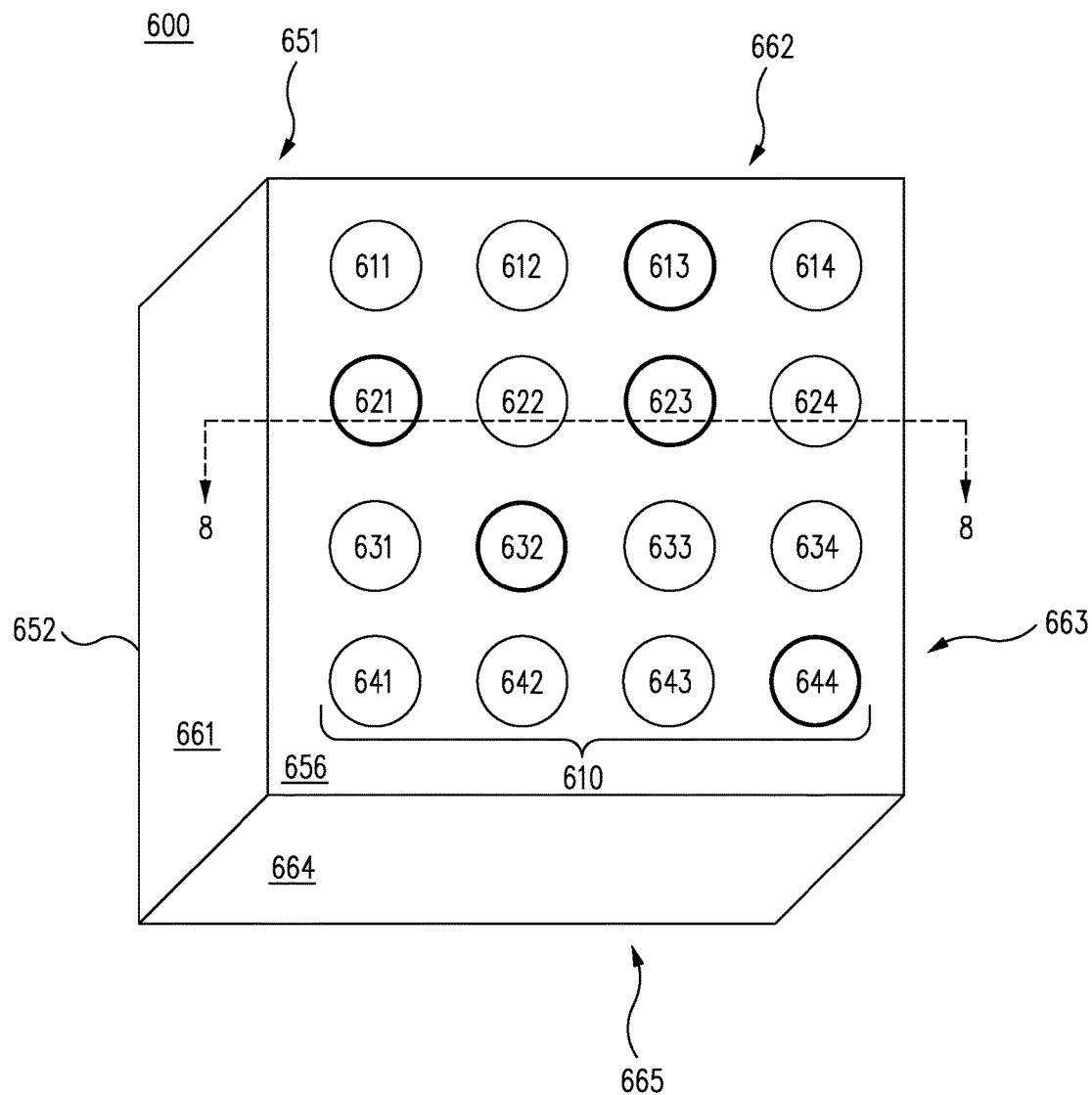
FIG. 6 illustrates an example perspective view of an example object of a unique identifier detection system, in accordance with one embodiment.

FIG. 6 illustrates an example perspective view of an example object 651 of a unique identifier detection system 600, in accordance with one embodiment. Referring to FIGS. 2 and 6 together, the example object 651 may be any of the objects 211A and 211B through 211N of FIG. 2. Referring to FIGS. 4 and 6 together, the example object 651 may be any of the first object 411 and the second object 421.

As illustrated in FIG. 6, the object 651 has an object housing 652 and an opaque substrate 656. In one embodiment, the opaque substrate 656 is coupled to the object housing 652 to define an enclosure in which a plurality of invisible light emitters (not shown) is housed. In one embodiment, the object housing 652 has a base wall 665 opposed to the opaque substrate 656. Although not shown in FIG. 6, in one embodiment, one or more components may be coupled to the base wall 665, such as a plurality of invisible light emitters, an object control circuit, and an object power supply.

In one embodiment, the object housing 652 includes one or more side walls extending between the base wall 665 and the opaque substrate 656. As illustrated in FIG. 6, the object housing 652 includes a first side wall 661, a second side wall 662 adjacent to the first side wall 661, a third side wall 663 adjacent to the second side wall 662 and opposed to the first side wall 661, and a fourth side wall 664 adjacent to the third side wall 663, adjacent to the first side wall 661, and opposed to the second side wall 662.

It is to be understood that although the object housing 652 illustrated in FIG. 6 has a cube shape, the shape illustrated in FIG. 6 is not meant to be limiting. Under some embodiments, an object housing 652 has a two-dimensional shape, a three-dimensional shape, and any other housing shape, as discussed herein, or as known in the art at the time of filing, or as developed, or becomes available, after the time of filing. It is to be further understood that although the opaque substrate 656 illustrated in FIG. 6 has a flat shape, the shape illustrated in FIG. 6 is not meant to be limiting. Under some embodiments, an opaque substrate 656 has a two-dimensional shape, a three-dimensional shape, and any other substrate shape, as discussed herein, or as known in the art at the time of filing, or as developed, or becomes available, after the time of filing. Although not illustrated in FIG. 6, the object 651 may include a transparent substrate coupled to the opaque substrate 656.

In one embodiment, the opaque substrate 656 includes a plurality of pattern apertures 610 designed from the opaque substrate 656. As illustrated in FIG. 6, the plurality of pattern apertures 610 comprises a first row of pattern apertures 611 through 614, a second row of pattern apertures 621 through 624, a third row of pattern apertures 631 through 634, and a fourth row of pattern apertures 641 through 644. It is to be understood that although the plurality of pattern apertures 610 is illustrated in FIG. 6 as a four by four grid of apertures, the plurality of pattern apertures 610 illustrated in FIG. 6 is not meant to be limiting. In some embodiments, the plurality of pattern apertures 610 may have any number, any formation, and any alignment, as discussed herein, or as known in the art at the time of filing, or as developed, or becomes available, after the time of filing.

In one embodiment, a portion of the plurality of pattern apertures 610 receive respective invisible light emitted by a respective invisible light emitter housed in an enclosure of the object 651, and the invisible light is formed by a number and/or a respective placement of the invisible light emitters to have an identification pattern unique to the object 651 in relation to other objects of the system. For example, if two car toys are used in a racing game, and the cars are visually similar, a first car may have two invisible light emitters and two respective pattern apertures through which emitted first invisible light is formed into a first identification pattern of two beams of invisible light. In this example, a second toy car may have three invisible light emitters and three respective pattern apertures through which emitted second invisible light is formed into a second identification pattern of three beams of invisible light. In this example, a device can identify the first toy car by sensing the first invisible light comprising the two beams of invisible light and detecting the first identification pattern, and the device can identify the second toy car by sensing the second invisible light comprising the three beams of invisible light and detecting the second identification pattern.

As depicted in the embodiment of FIG. 6, a portion of the plurality of pattern apertures 610 receive invisible light from respective invisible light emitters (not shown). It is to be understood that the plurality of pattern apertures 610 that receive invisible light is not limited to the pattern apertures depicted in FIG. 6, as they are depicted for illustrative purposes. In one embodiment, the pattern apertures 613, 621, 623, 632, and 644 receive invisible light from respective invisible light emitters that are activated by an object control circuit (not shown). In one embodiment, the invisible light emitted from the object 651 comprises an identification pattern based on the invisible light received by the pattern apertures 613, 621, 623, 632, and 644.

In one embodiment, the pattern apertures 611, 612, 614, 622, 624, 631, 633, 634, 641, 642, and 643 that do not receive invisible light are associated with a respective invisible light emitter that is not activated by an object control circuit. In this embodiment, the object control circuit could change the identification pattern by activating a different portion of the plurality of invisible light emitters. For example, although not shown, the pattern apertures 612, 623, 633, and 634 could be the apertures that receive invisible light. In one embodiment, the pattern apertures 611, 612, 614, 622, 624, 631, 633, 634, 641, 642, and 643 that do not receive invisible light are not associated with a respective invisible light emitter. Under this embodiment, the number of invisible light emitters is reduced to those associated with the pattern apertures 613, 621, 623, 632, and 644.

Figure 7:
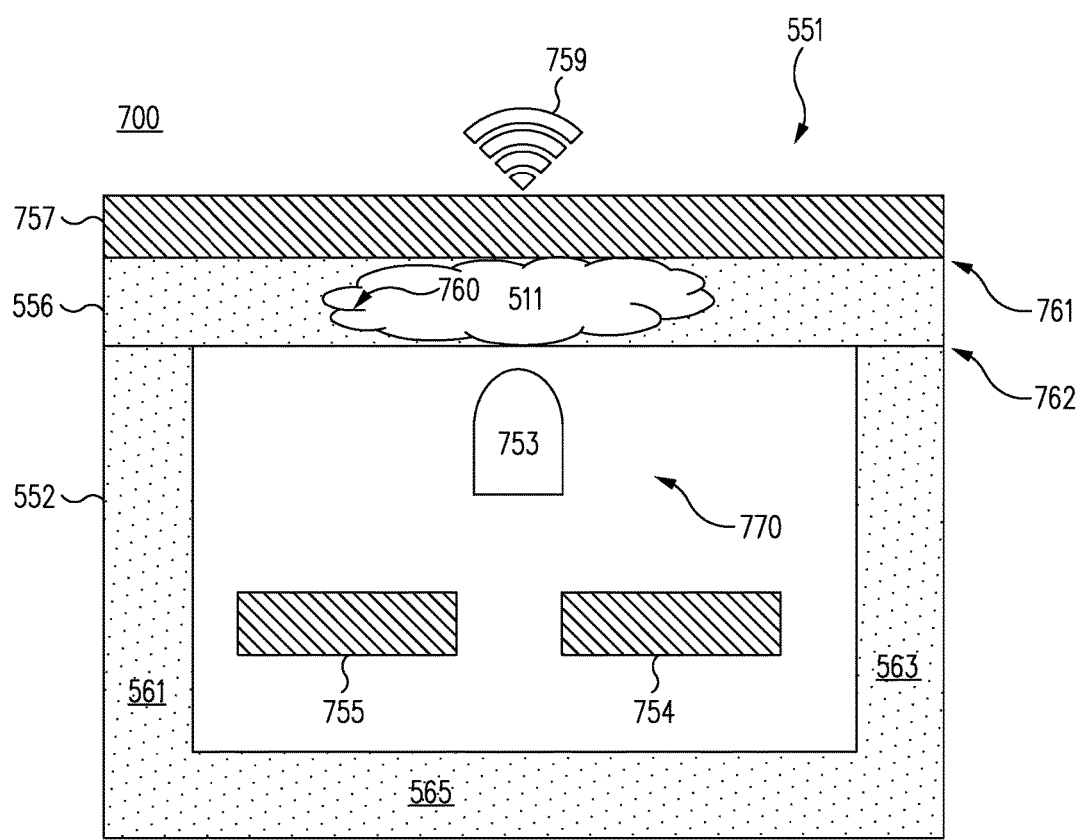
FIG. 7 is a schematic cross-section of an example object of a unique identifier detection system, in accordance with one embodiment.

FIG. 7 is a schematic cross-section of an example object 551 of a unique identifier detection system 700 as illustrated at line 7-7 of the embodiment of FIG. 5, in accordance with one embodiment. Referring to FIGS. 5 and 7 together, the object 551 includes an object housing 552 and an opaque substrate 556 coupled to the object housing 552. As illustrated in FIG. 7, a schematic cross-sectional view of one embodiment of the object housing 552 includes a base wall 565, a first side wall 561, and an opposing third side wall 563. In one embodiment, an enclosure 770 of the object 551 is defined at least by the opaque substrate 556. In one embodiment, an enclosure 770 of the object 551 is defined by the opaque substrate 556 coupled to the object housing 552.

In one embodiment, the invisible light source 753 is housed in the enclosure 770. In one embodiment, the invisible light source 753 is coupled to the object housing 552. In one embodiment, the invisible light source 753 is a light emitting diode (LED) that emits invisible light. In one embodiment, the invisible light source 753 is a plurality of light emitting diodes (LEDs) that emit invisible light. In one embodiment, the invisible light source 753 emits infrared light. In one embodiment, the invisible light source 753 emits ultraviolet light.

In one embodiment, the object 551 includes an object power supply 754 that is housed in the enclosure 770. In one embodiment, the object power supply 754 is coupled to the object housing 552. In one embodiment, the object power supply 754 is electronically coupled to the invisible light source 753 to supply power.

In one embodiment, the object 551 includes an object control circuit 755 that is housed in the enclosure 770. In one embodiment, the object control circuit 755 is coupled to the object housing 552. In one embodiment, the object control circuit 755 is electronically coupled to the invisible light source 753. In one embodiment, the object control circuit 755 is electronically coupled to the object power supply 754. In one embodiment, the object control circuit 755 activates the invisible light source 753 to emit invisible light. In one embodiment, the object control circuit 755 activates the invisible light source 753 with power from the object power supply 754.

In one embodiment, the opaque substrate 556 includes an aperture design 511 formed from the opaque substrate 556. In one embodiment, the aperture design 511 comprises one or more apertures. In one embodiment, the opaque substrate 556 includes an inner surface 762. In one embodiment, the inner surface 762 forms, at least in part, the enclosure 770. In one embodiment, the opaque substrate 556 includes an outer surface 761 opposed to the inner surface 762. In one embodiment, the opaque substrate 556 includes at least one side surface 760 that extends between the outer surface 761 and the inner surface 762. In one embodiment, the side surface 760 of the opaque substrate 556 defines the aperture design 511. It is to be understood that the opaque substrate 556 may include any number of side surfaces 760 to define any number of apertures of the aperture design 511. It is to be further understood that the side surface 760 shape of a cloud illustrated in FIG. 7 is not meant to be limiting, and that a side surface 760 may define any shaped aperture, such as a circle, a square, a rectangle, a cylinder, a cube, and any other aperture shape, as discussed herein, or as known in the art at the time of filing, or as developed, or becomes available, after the time of filing.

In one embodiment, the opaque substrate 556 comprises material that is opaque to the invisible light emitted by the invisible light source 753. In one embodiment, the aperture design 511 defined by the side surface 760 of the opaque substrate 556 receives invisible light emitted from the invisible light source 753. In one embodiment, the invisible light emitted from the invisible light source 753 is formed to have an identification pattern 759 that conforms to the side surface 760. In one embodiment, the invisible light is formed to have the identification pattern 759 that is emitted from the object 551.

In one embodiment, the object 551 includes a transparent substrate 757. In one embodiment, the transparent substrate 757 is coupled to the opaque substrate 556. In one embodiment, the transparent substrate 757 covers at least the aperture design 511 formed by the side surface 760. In one embodiment, the transparent substrate 757 provides a protective layer over the aperture design 511 formed by the side surface 760. In one embodiment, the transparent substrate 757 comprises material that is transparent to the invisible light emitted by the invisible light source 753.

In one embodiment, the invisible light is received by the aperture design 511 that is defined by the side surface 760. In one embodiment, such invisible light is conformed to the identification pattern 759 as it exits the aperture design 511 and passes through the transparent substrate 757 into the environment adjacent to the transparent substrate 757. In one embodiment, the invisible light corresponding to the identification pattern 759 is sensed by a device.

Figure 8:
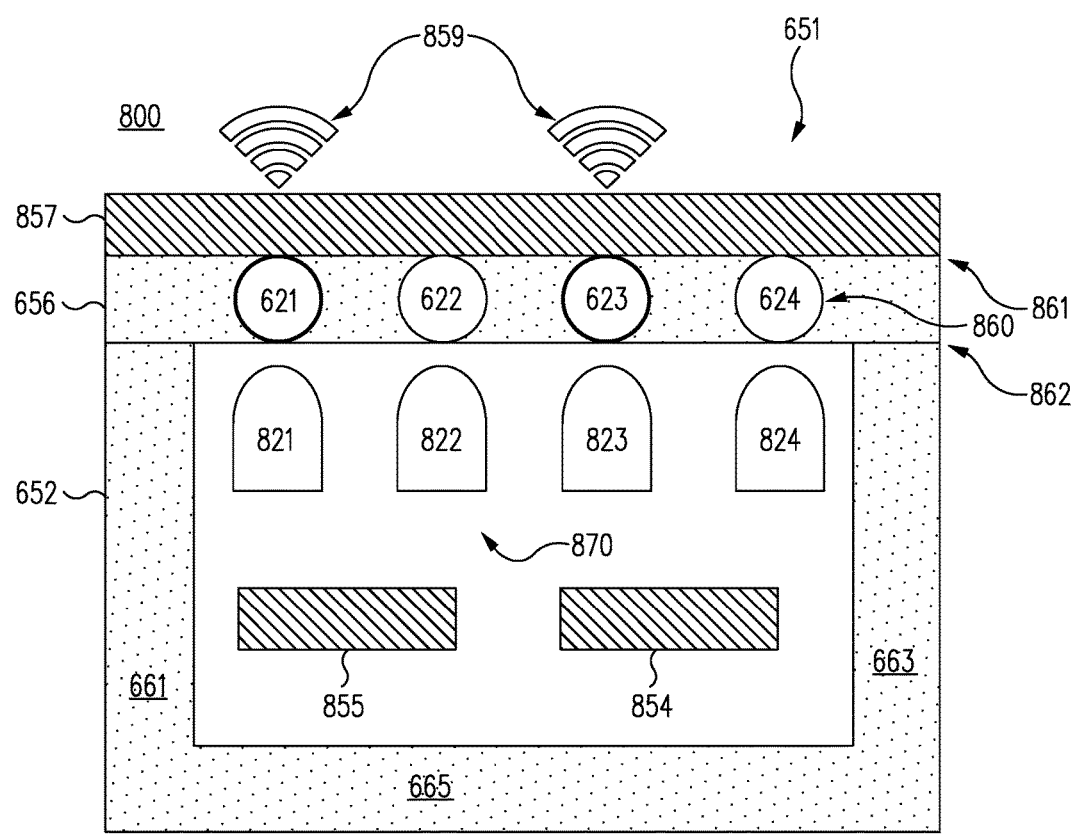
FIG. 8 is a schematic cross-section of an example object of a unique identifier detection system, in accordance with one embodiment.

FIG. 8 is a schematic cross-section of an example object 651 of a unique identifier detection system 800 as illustrated at line 8-8 of the embodiment of FIG. 6, in accordance with one embodiment. Referring to FIGS. 6 and 8 together, the object 651 includes an object housing 652 and an opaque substrate 656 coupled to the object housing 652. As illustrated in FIG. 8, a schematic cross-sectional view of one embodiment of the object housing 652 includes a base wall 665, a first side wall 661, and an opposing third side wall 663. In one embodiment, an enclosure 870 of the object 651 is defined at least by the opaque substrate 656. In one embodiment, an enclosure 870 of the object 651 is defined by the opaque substrate 656 coupled to the object housing 652.

In one embodiment, the invisible light emitters 821 through 824 are housed in the enclosure 870. In one embodiment, the invisible light emitters 821 through 824 are coupled to the object housing 652. In one embodiment, the invisible light emitters 821 through 824 are respective light emitting diodes (LED) that emit invisible light. In one embodiment, the invisible light emitters 821 through 824 emit infrared light. In one embodiment, the invisible light emitters 821 through 824 emit ultraviolet light.

In one embodiment, the object 651 includes an object power supply 854 that is housed in the enclosure 870. In one embodiment, the object power supply 854 is coupled to the object housing 652. In one embodiment, the object power supply 854 is electronically coupled to the invisible light emitters 821 through 824 to supply power.

In one embodiment, the object 651 includes an object control circuit 855 that is housed in the enclosure 870. In one embodiment, the object control circuit 855 is coupled to the object housing 652. In one embodiment, the object control circuit 855 is electronically coupled to the invisible light emitters 821 through 824. In one embodiment, the object control circuit 855 is electronically coupled to the object power supply 854. In one embodiment, the object control circuit 855 activates a portion of the invisible light emitters 821 through 824 to emit invisible light with an identification pattern. In one embodiment, the object control circuit 855 activates a portion of the invisible light emitters 821 through 824 with power from the object power supply 854.

As depicted in the embodiment of FIG. 8, a portion of the plurality of pattern apertures 621 through 624 receive invisible light from respective invisible light emitters 821 through 824. It is to be understood that the plurality of pattern apertures 621 through 624 that receive invisible light is not limited to the plurality of pattern apertures depicted in FIG. 6, as they are depicted for illustrative purposes. In one embodiment, the pattern apertures 621 and 623 receive invisible light from respective invisible light emitters 821 and 823 that are activated by the object control circuit 855. In one embodiment, the invisible light emitted from the object 651 comprises an identification pattern 859 based on the invisible light emitted by the invisible light emitters 821 and 823.

It is to be understood that in one embodiment, the pattern apertures 622 and 624 that do not receive invisible light from respective invisible light emitters 822 and 824 that are not activated by the object control circuit 855. In this embodiment, the object control circuit 855 could change the identification pattern 859 by activating a different portion of the plurality of invisible light emitters 821 through 824. For example, although not shown, the invisible light emitters 822 and 823 could be activated by the object control circuit 855. In one embodiment, any number of invisible light emitters 821 through 824 could be activated to form a unique identification pattern 859.

Although FIG. 8 depicts two invisible light emitters 822 and 824 that are not activated, in one embodiment, the object 651 does not include those two invisible light emitters 822 and 824. Under this embodiment, the number of invisible light emitters is reduced to the invisible light emitters 821 and 823, In one embodiment, the opaque substrate 656 includes a plurality of pattern apertures 621 through 624 formed from the opaque substrate 656. In one embodiment, the opaque substrate 656 includes an inner surface 862. In one embodiment, the inner surface 862 forms, at least in part, the enclosure 870. In one embodiment, the opaque substrate 656 includes an outer surface 861 opposed to the inner surface 862. In one embodiment, the opaque substrate 656 includes at least one side surface 860 that extends between the outer surface 861 and the inner surface 862. In one embodiment, the side surface 860 of the opaque substrate 656 defines a respective one of the plurality of pattern apertures 621 through 624. Although FIG. 8 depicts the side surface 860 associated with the pattern aperture 624, it is to be understood that the opaque substrate 656 may include any number of side surfaces 860 to define any number of pattern apertures 621 through 624. It is to be further understood that the side surface 860 shape of a circle illustrated in FIG. 8 is not meant to be limiting, and that a side surface 860 may define any shaped aperture, such as an oval, a square, a rectangle, a cylinder, a cube, and any other aperture shape, as discussed herein, or as known in the art at the time of filing, or as developed, or becomes available, after the time of filing.

In one embodiment, the opaque substrate 656 comprises material that is opaque to the invisible light emitted by the plurality of invisible light emitters 821 through 824. As depicted in FIG. 8, the pattern aperture 624 defined by the side surface 860 of the opaque substrate 656 is configured to receive invisible light emitted from the invisible light emitter 824. In one embodiment, the invisible light emitted from the plurality of invisible light emitters 821 through 824 is formed to have an identification pattern 859 based on which of the plurality of invisible light emitters 821 through 824 is activated. In one embodiment, the invisible light is formed by a certain number, activation, and/or placement of the plurality of invisible light emitters 821 through 824 to have the identification pattern 859 that is emitted from the object 651.

In one embodiment, the object 651 includes a transparent substrate 857. In one embodiment, the transparent substrate 857 is coupled to the opaque substrate 656. In one embodiment, the transparent substrate 857 covers at least the pattern aperture 624 formed by the side surface 860. In one embodiment, the transparent substrate 857 provides a layer over the pattern apertures 621 through 624. In one embodiment, the transparent substrate 857 comprises material that is transparent to the invisible light emitted by the plurality of invisible light emitters 821 through 824.

In one embodiment the identification pattern 859 is based in part on the shape of at least one of the plurality of pattern apertures 621 through 624. In one embodiment, the respective invisible light is received by the respective one of the plurality of pattern apertures 621 through 624. In one embodiment, such invisible light is conformed, at least in part, to the identification pattern 859 as it exits the respective one of the plurality of pattern apertures 621 through 624 and passes through the transparent substrate 857 into the environment adjacent to the transparent substrate 857. In one embodiment, the invisible light corresponding to the identification pattern 859 is sensed by a device. As illustrated in FIG. 8, the identification pattern 859 can be based on at least two beams of invisible light that indicate the number of activated invisible light emitters 821 through 824 and the respective positions of the activated invisible light emitters 821 through 824.

Figure 9:
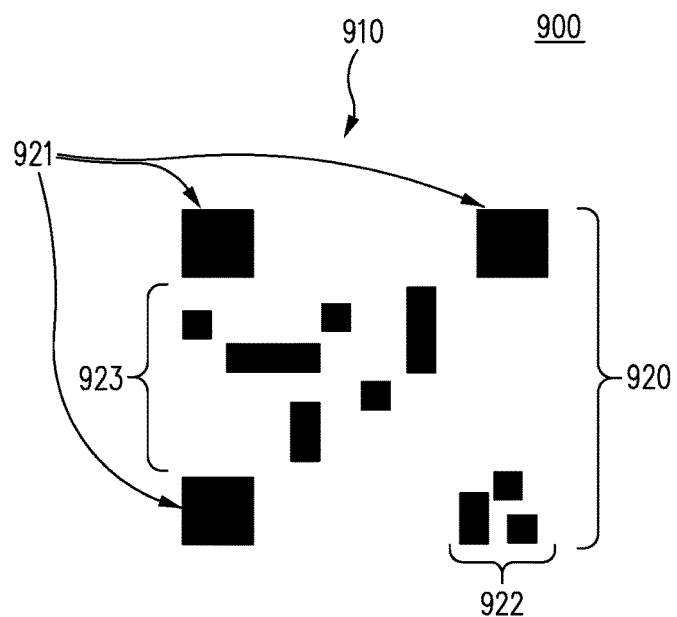
FIG. 9 illustrates an example identification pattern of a unique identifier detection system, in accordance with one embodiment.

FIG. 9 illustrates an example identification pattern 910 of a unique identifier detection system 900, in accordance with one embodiment. In one embodiment, the aperture design of the identification pattern 910 is defined by an opaque substrate, such as the opaque substrate 556 of FIG. 5. As illustrated in FIG. 9, in one embodiment, the identification pattern 910 is represented by a quick response (QR) code. It is to be understood that the illustration of FIG. 9 is not meant to be limiting and that an aperture design 920 of the identification pattern 910 can have any number of variations, as discussed herein, or as known in the art at the time of filing, or as developed, or becomes available, after the time of filing.

In one embodiment, the aperture design 920 of the identification pattern 910 includes a fiducial marker design 921. In one embodiment, the fiducial marker design 921 comprises at least one aperture formed from an opaque substrate. In one embodiment, the fiducial marker design 921 receives invisible light emitted by an invisible light source. In one embodiment, the fiducial marker design 921 provides information of a fiducial marker 981 of at least one point of reference for the aperture design 920 of the identification pattern 910, such as an orientation of the aperture design 920 of the identification pattern 910. For example, a fiducial marker 981 may indicate that an object is pointing north.

In one embodiment, the aperture design 920 of the identification pattern 910 includes an object type design 922. In one embodiment, the object type design 922 comprises at least one aperture formed from an opaque substrate. In one embodiment, the object type design 922 receives invisible light emitted by an invisible light source. In one embodiment, the object type design 922 provides information of an object type 982 about the type of object that is associated with the aperture design 920 of the identification pattern 910. For example, if the object is a toy car, the object type 982 may include information that the object type is a "toy car."

In one embodiment, the aperture design 920 of the identification pattern 910 includes an object identification design 923. In one embodiment, the object identification design 923 comprises at least one aperture formed from an opaque substrate. In one embodiment, the object identification design 923 receives invisible light emitted by an invisible light source. In one embodiment, the object identification design 923 provides information of a unique identifier 983 that uniquely identifies the object that is associated with the aperture design 920 of the identification pattern 910 in relation to other adjacent and similar objects of the system. For example, the object identifier 983 may include information regarding a serial number of an object, such as "4321," where a second serial number of a second object may be "4322."

In one embodiment, the aperture design 920 of the identification pattern 910 includes error correction information (not shown). In one embodiment, error correction information can resolve issues related to a line of sight of the aperture design 920 of the identification pattern 910 in relation to an invisible light sensor. In one embodiment, error correction information can resolve issues related to ambient invisible light in the adjacent environment of the aperture design 920 of the identification pattern 910. In one embodiment, error correction information can resolve issues related to failure of a component of an invisible light source. Error correction information includes Reed-Solomon error correction and other error correction information, as discussed herein, or as known in the art at the time of filing, or as developed, or becomes available, after the time of filing.

In one embodiment, the unique identifier 983 is utilized by a financial management system. For example, a user may manage the user's finances with mixed reality in which the user is managing the finances of physical assets that are objects, such as the objects 111A and 111B through 111N of FIG. 1. In this example, a user wears smart eyewear and each physical asset in view of the user is uniquely identified via respective unique identifiers 983. In this example, the financial information of each physical asset is managed within the financial management system by mapping a unique identifier 983 to associated financial information stored in the financial management system.

Figure 10:
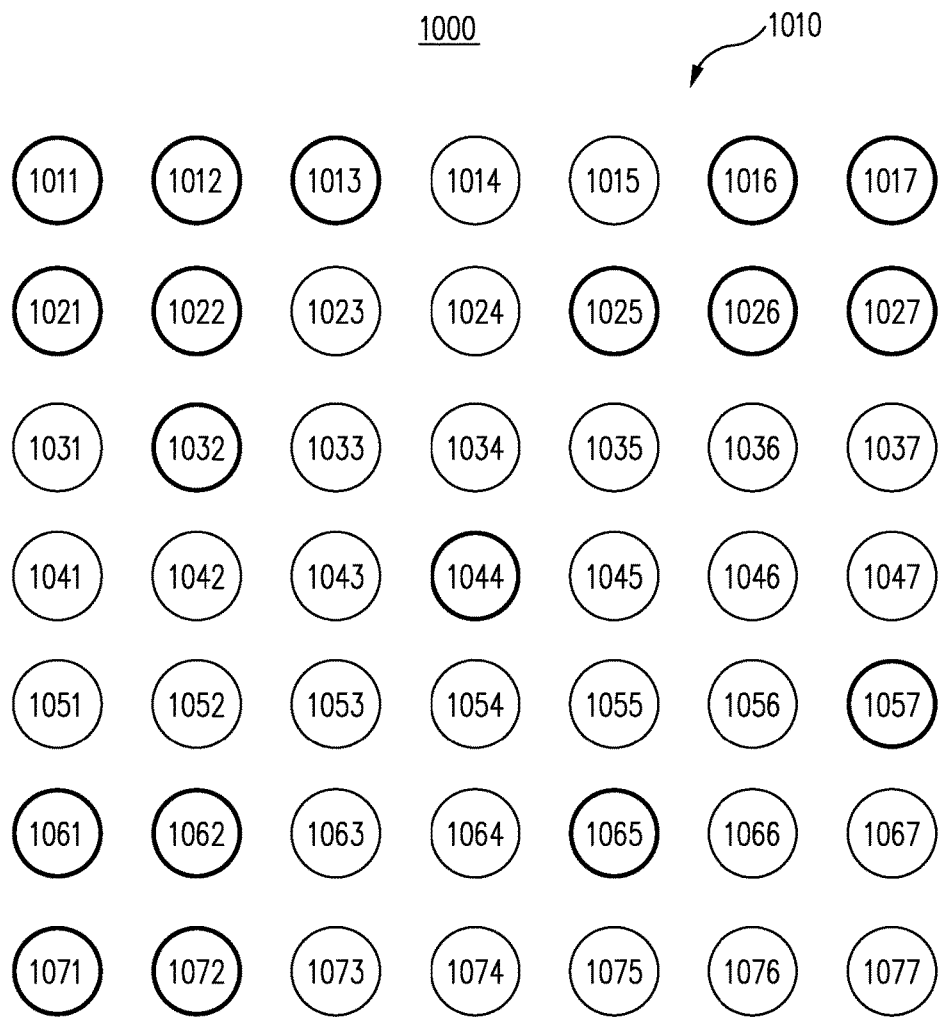
FIG. 10 illustrates an example identification pattern of a unique identifier detection system, in accordance with one embodiment.

FIG. 10 illustrates an example identification pattern 1010 of a unique identifier detection system 1000, in accordance with one embodiment. In one embodiment, the plurality of activated invisible light emitters of the identification pattern 1010 is based on certain invisible light emitters being activated by an object control circuit. It is to be understood that the illustration of FIG. 10 is not meant to be limiting and that a plurality of activated invisible light emitters of the identification pattern 1010 can have any number of variations, as discussed herein, or as known in the art at the time of filing, or as developed, or becomes available, after the time of filing. It is to be further understood that for each invisible light emitter, there may be a corresponding aperture defined by an opaque substrate.

In one embodiment, the plurality of activated invisible light emitters of the identification pattern 1010 includes a plurality of fiducial marker activated invisible light emitters 1011, 1012, 1021, 1022, 1016, 1017, 1026, 1027, 1061, 1062, 1071, and 1072. In one embodiment, the plurality of fiducial marker activated invisible light emitters is grouped into a first group of fiducial marker activated invisible light emitters 1011, 1012, 1021, and 1022, into a second group of fiducial marker activated invisible light emitters 1016, 1017, 1026, and 1027, and into a third group of fiducial marker activated invisible light emitters 1061, 1062, 1071, and 1072. In one embodiment, the plurality of fiducial marker activated invisible light emitters 1011, 1012, 1021, 1022, 1016, 1017, 1026, 1027, 1061, 1062, 1071, and 1072 provide information of a fiducial marker 1081 of at least one point of reference for the identification pattern 1010, such as an orientation of the identification pattern 1010. For example, a fiducial marker 1081 may indicate that an object is pointing north.

In one embodiment, the plurality of activated invisible light emitters of the identification pattern 1010 includes a plurality of object type activated invisible light emitters 1057 and 1065. In one embodiment, the plurality of object type activated invisible light emitters 1057 and 1065 comprise at least one invisible light emitter activated by an object control circuit. In one embodiment, the plurality of object type activated invisible light emitters 1057 and 1065 provide information of an object type 1082 about the type of object that is associated with the identification pattern 1010. For example, if the object is a toy car, the object type 1082 may include information that the object type is a "toy car."

In one embodiment, the plurality of activated invisible light emitters of the identification pattern 1010 includes a plurality of object identification activated invisible light emitters 1025, 1032, and 1044. In one embodiment, the plurality of object identification activated invisible light emitters 1025, 1032, and 1044 comprise at least one invisible light emitter activated by an object control circuit. In one embodiment, the plurality of object identification activated invisible light emitters 1025, 1032, and 1044 provide information of a unique identifier 1083 that uniquely identifies the object that is associated with the identification pattern 1010 in relation to other adjacent and similar objects of the system. For example, the object identifier 1083 may include information regarding a serial number of an object, such as "4321," where a second serial number of a second object may be "4322."

In one embodiment, the plurality of activated invisible light emitters of the identification pattern 1010 includes error correction information (not shown). In one embodiment, error correction information can resolve issues related to a line of sight of the plurality of activated invisible light emitters of the identification pattern 1010 in relation to an invisible light sensor. In one embodiment, error correction information can resolve issues related to ambient invisible light in the adjacent environment of the plurality of activated invisible light emitters of the identification pattern 1010. In one embodiment, error correction information can resolve issues related to failure of a component of an invisible light emitter. Error correction information includes Reed-Solomon error correction and other error correction information, as discussed herein, or as known in the art at the time of filing, or as developed, or becomes available, after the time of filing.

In one embodiment, the unique identifier 1083 is utilized by a financial management system. For example, a user may manage the user's finances with mixed reality in which the user is managing the finances of physical assets that are objects, such as the objects 211A and 211B through 211N of FIG. 2. In this example, a user wears smart eyewear and each physical asset in view of the user is uniquely identified via respective unique identifiers 1083. In this example, the financial information of each physical asset is managed within the financial management system by mapping a unique identifier 1083 to associated financial information stored in the financial management system.

Exemplary Process

Figure 11:
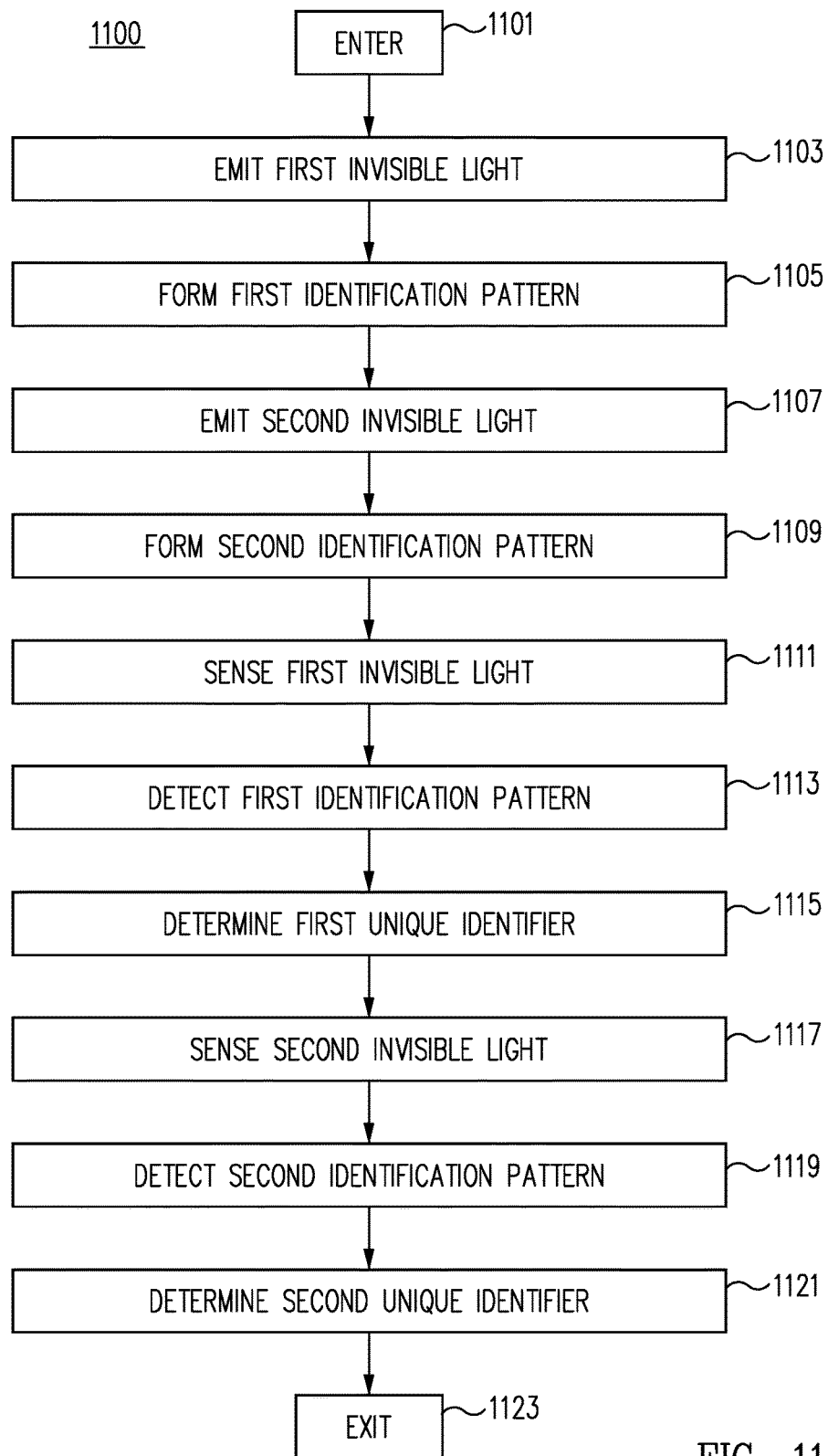
FIG. 11 is a flow diagram of a process for unique identifier detection, in accordance with one embodiment.

FIG. 11 is a flow diagram of a process 1100 for unique identifier detection, in accordance with one embodiment. Referring to FIGS. 1, 3, 5, 7, 9, and 11 together, the process 1100 for unique identifier detection begins at ENTER OPERATION 1101 and process flow proceeds to EMIT FIRST INVISIBLE LIGHT OPERATION 1103.

In one embodiment, at EMIT FIRST INVISIBLE LIGHT OPERATION 1103, the first invisible light 319 is emitted from the first invisible light source 313 coupled to the first object housing 312 of the first object 311. In one embodiment, the first invisible light source 313 is an infrared light source. In one embodiment, the first invisible light source 313 comprises one or more light emitting diodes (LED) that emit invisible light, such as infrared light. In one embodiment, the first invisible light source 313 is powered by the first object power supply 314 and controlled by the first object control circuit 315.

In one embodiment, once the first invisible light 319 is emitted from the first invisible light source 313 at EMIT FIRST INVISIBLE LIGHT OPERATION 1103, process flow proceeds to FORM FIRST IDENTIFICATION PATTERN OPERATION 1105.

In one embodiment, at FORM FIRST IDENTIFICATION PATTERN OPERATION 1105, the first identification pattern 759 is formed from the first invisible light 319 based on the first aperture design 511 designed from the first opaque substrate 316. In one embodiment, the first opaque substrate 316 is coupled to the first object housing 312. In one embodiment, the first opaque substrate 316 comprises material that is opaque to the first invisible light 319 emitted by the first invisible light source 313. In one embodiment, the first aperture design 511 is designed from at least one respective side surface 760 of the first opaque substrate 316. In one embodiment, the first aperture design 511 is configured to receive the first invisible light 319 emitted by the first invisible light source 313.

In one embodiment, once the first identification pattern 759 is formed from the first invisible light 319 at FORM FIRST IDENTIFICATION PATTERN OPERATION 1105, process flow proceeds to EMIT SECOND INVISIBLE LIGHT OPERATION 1107.

In one embodiment, at EMIT SECOND INVISIBLE LIGHT OPERATION 1107, the second invisible light 329 is emitted from the second invisible light source 323 coupled to the second object housing 322 of the second object 321. In one embodiment, the second invisible light source 323 is an infrared light source. In one embodiment, the second invisible light source 323 comprises one or more light emitting diodes (LED) that emit invisible light, such as infrared light. In one embodiment, the second invisible light source 323 is powered by the second object power supply 324 and controlled by the second object control circuit 325.

In one embodiment, once the second invisible light 329 is emitted from the second invisible light source 323 at EMIT SECOND INVISIBLE LIGHT OPERATION 1107, process flow proceeds to FORM SECOND IDENTIFICATION PATTERN OPERATION 1109.

In one embodiment, at FORM SECOND IDENTIFICATION PATTERN OPERATION 1109, the second identification pattern 759 is formed from the second invisible light 329 based on the second aperture design 511 designed from the second opaque substrate 326. In one embodiment, the second identification pattern of FORM SECOND IDENTIFICATION PATTERN OPERATION 1109 is distinct from the first identification pattern of FORM FIRST IDENTIFICATION PATTERN OPERATION 1105. In one embodiment, the second opaque substrate 326 is coupled to the second object housing 322. In one embodiment, the second opaque substrate 326 comprises material that is opaque to the second invisible light 329 emitted by the second invisible light source 323. In one embodiment, the second aperture design 511 is designed from at least one respective side surface 760 of the second opaque substrate 326. In one embodiment, the second aperture design 511 is configured to receive the second invisible light 329 emitted by the second invisible light source 323.

In one embodiment, once the second identification pattern 759 is formed from the second invisible light 329 at FORM SECOND IDENTIFICATION PATTERN OPERATION 1109, process flow proceeds to SENSE FIRST INVISIBLE LIGHT OPERATION 1111.

In one embodiment, at SENSE FIRST INVISIBLE LIGHT OPERATION 1111, the first invisible light 319 is sensed by the invisible light sensor 307 coupled to the device housing 302 of the device 301. In one embodiment, the invisible light sensor 307 is configured to sense invisible light within the invisible light spectrum emitted by the first invisible light source 313. In one embodiment, the first invisible light source 313 emits infrared light, and the invisible light sensor 307 senses such infrared light.

In one embodiment, once the first invisible light 319 is sensed by the invisible light sensor 307 at SENSE FIRST INVISIBLE LIGHT OPERATION 1111, process flow proceeds to DETECT FIRST IDENTIFICATION PATTERN OPERATION 1113.

In one embodiment, at DETECT FIRST IDENTIFICATION PATTERN OPERATION 1113, the device control circuit 305 detects the first identification pattern 759 of the first invisible light 319 sensed by the invisible light sensor 307. In one embodiment, the device control circuit 305 is coupled to the device housing 302 of the device 301. In one embodiment, the device control circuit 305 is electronically coupled to the invisible light sensor 307. In one embodiment, the device control circuit 305 controls the invisible light sensor 307 to sense invisible light.

In one embodiment, once the device control circuit 305 detects the first identification pattern 759 of the first invisible light 319 at DETECT FIRST IDENTIFICATION PATTERN OPERATION 1113, process flow proceeds to DETERMINE FIRST UNIQUE IDENTIFIER OPERATION 1115.

In one embodiment, at DETERMINE FIRST UNIQUE IDENTIFIER OPERATION 1115, the device control circuit 305 determines the first unique identifier 983 based on the first identification pattern 759. In one embodiment, the device 301 includes a processor utilized by the device control circuit 305 to determine the first unique identifier 983. In one embodiment, the device 301 includes memory utilized by the device control circuit 305 to determine the first unique identifier 983. For example, the first identification pattern 759 may include information regarding error correction, a mapping of that error correction may be stored in the memory, and the processor may process an error and correct the error based on the mapping of the error correction stored in the memory.

In one embodiment, once the device control circuit 305 determines the first unique identifier 983 at DETERMINE FIRST UNIQUE IDENTIFIER OPERATION 1115, process flow proceeds to SENSE SECOND INVISIBLE LIGHT OPERATION 1117.

In one embodiment, at SENSE SECOND INVISIBLE LIGHT OPERATION 1117, the second invisible light 329 is sensed by the invisible light sensor 307 coupled to the device housing 302 of the device 301. In one embodiment, the invisible light sensor 307 is configured to sense invisible light within the invisible light spectrum emitted by the second invisible light source 323. In one embodiment, the second invisible light source 323 emits infrared light, and the invisible light sensor 307 senses such infrared light.

In one embodiment, once the second invisible light 329 is sensed by the invisible light sensor 307 at SENSE SECOND INVISIBLE LIGHT OPERATION 1117, process flow proceeds to DETECT SECOND IDENTIFICATION PATTERN OPERATION 1119.

In one embodiment, at DETECT SECOND IDENTIFICATION PATTERN OPERATION 1119, the device control circuit 305 detects the second identification pattern 759 of the second invisible light 329 sensed by the invisible light sensor 307. In one embodiment, the device control circuit 305 is coupled to the device housing 302 of the device 301. In one embodiment, the device control circuit 305 is electronically coupled to the invisible light sensor 307. In one embodiment, the device control circuit 305 controls the invisible light sensor 307 to sense invisible light.

In one embodiment, once the device control circuit 305 detects the second identification pattern 759 at DETECT SECOND IDENTIFICATION PATTERN OPERATION 1119, process flow proceeds to DETERMINE SECOND UNIQUE IDENTIFIER OPERATION 1121.

In one embodiment, at DETERMINE SECOND UNIQUE IDENTIFIER OPERATION 1121, the device control circuit 305 determines the second unique identifier 983 based on the second identification pattern 759. In one embodiment, the second unique identifier of DETERMINE SECOND UNIQUE IDENTIFIER OPERATION 1121 is distinct from the first unique identifier of DETERMINE FIRST UNIQUE IDENTIFIER OPERATION 1115. In one embodiment, the device 301 includes a processor utilized by the device control circuit 305 to determine the second unique identifier 983. In one embodiment, the device 301 includes memory utilized by the device control circuit 305 to determine the second unique identifier 983. For example, the second identification pattern 759 may include information regarding error correction, a mapping of that error correction may be stored in the memory, and the processor may process an error and correct the error based on the mapping of the error correction stored in the memory.

In one embodiment, once the device control circuit 305 determines the second unique identifier 983 at DETERMINE SECOND UNIQUE IDENTIFIER OPERATION 1121, process flow proceeds to EXIT OPERATION 1123.

In one embodiment, at EXIT OPERATION 1123, the process 1100 for unique identifier detection is exited.

In one embodiment, the process 1100 includes additional objects such as a third object 111N. In this embodiment, the third invisible light source 113N of the third object 111N emits third invisible light 119N that was formed by the third aperture design 511 of the third opaque substrate 116N to have a third identification pattern 759. In this embodiment, the invisible light sensor 107 of the device 101 senses the third invisible light 119N emitted by the third object 111N. In this embodiment, the device control circuit 305 of the device 101 detects the third identification pattern 759 and determines a third unique identifier 983 based on the third identification pattern 759. It is to be understood that any number of objects 111A and 111B through 111N can be included in the process 1100.

Figure 12:
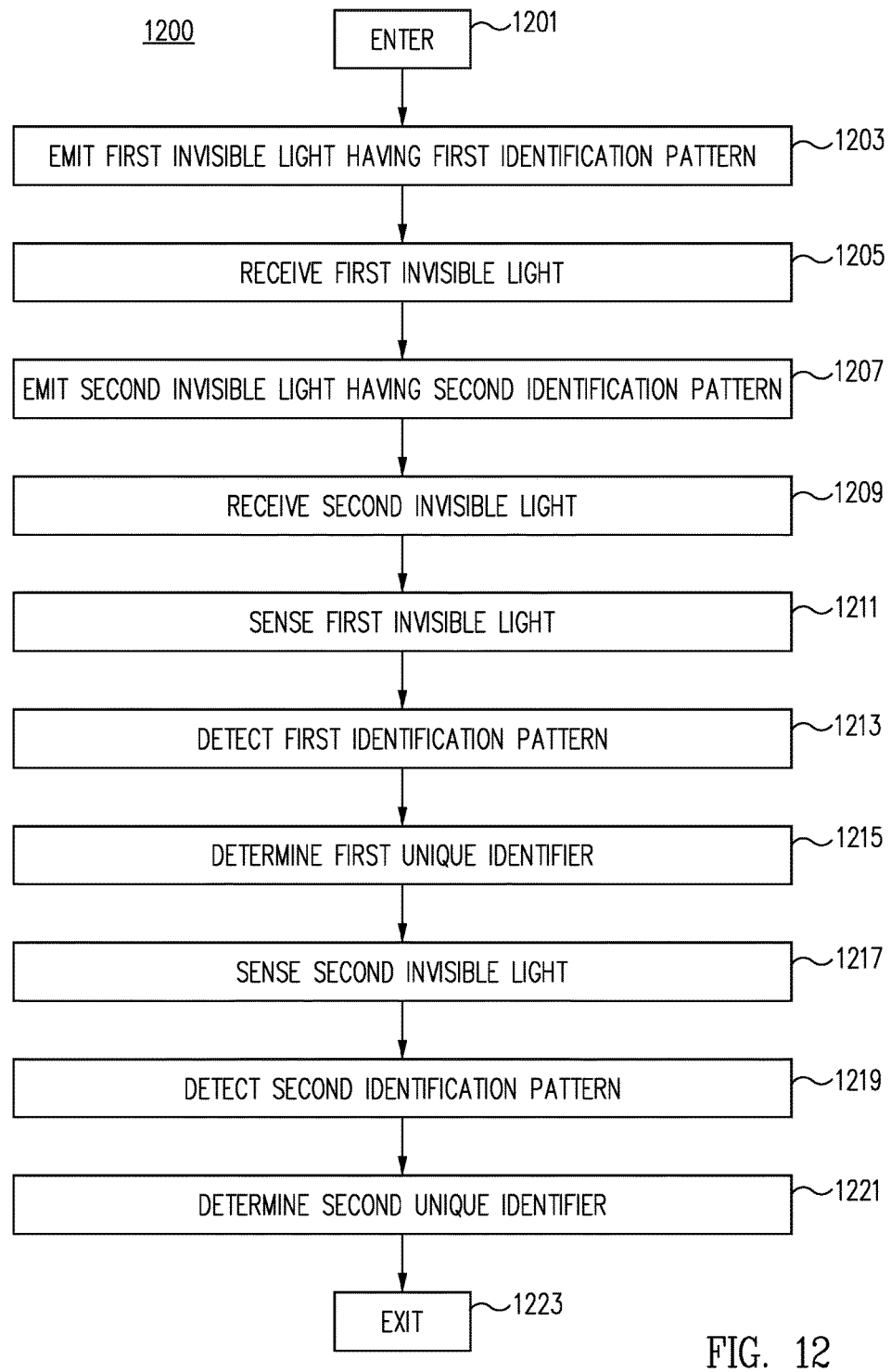
FIG. 12 is a flow diagram of a process for unique identifier detection, in accordance with one embodiment.

FIG. 12 is a flow diagram of a process 1200 for unique identifier detection, in accordance with one embodiment. Referring to FIGS. 2, 4, 6, 8, 10, and 12 together, the process 1200 for unique identifier detection begins at ENTER OPERATION 1201 and process flow proceeds to EMIT FIRST INVISIBLE LIGHT HAVING FIRST IDENTIFICATION PATTERN OPERATION 1203.

In one embodiment, at EMIT FIRST INVISIBLE LIGHT HAVING FIRST IDENTIFICATION PATTERN OPERATION 1203, the first invisible light 419 having the first identification pattern 859 is emitted from at least a portion of the first plurality of invisible light emitters 413 coupled to the first object housing 412 of the first object 411. In one embodiment, the first plurality of invisible light emitters 413 are infrared light emitters. In one embodiment, the first plurality of invisible light emitters 413 comprises a plurality of light emitting diodes (LED) that emit invisible light, such as infrared light. In one embodiment, the first plurality of invisible light emitters 413 is powered by the first object power supply 414 and controlled by the first object control circuit 415.

In one embodiment, the first invisible light 419 corresponds to a first identification pattern 859. In one embodiment, the first object control circuit 415 activates a first portion of the first plurality of invisible light emitters 413 to emit the first invisible light 419. In one embodiment, the first identification pattern 859 of the first invisible light 419 is based on the activation of a number of the first plurality of invisible light emitters 413. In one embodiment, the first identification pattern 859 of the first invisible light 419 is based on the position of each of the first plurality of invisible light emitters 413 that are activated.

In one embodiment, once the first invisible light 419 having the first identification pattern 859 is emitted from at least a portion of the first plurality of invisible light emitters 413 at EMIT FIRST INVISIBLE LIGHT HAVING FIRST IDENTIFICATION PATTERN OPERATION 1203, process flow proceeds to RECEIVE FIRST INVISIBLE LIGHT OPERATION 1205.

In one embodiment, at RECEIVE FIRST INVISIBLE LIGHT OPERATION 1205, a respective one of the first plurality of pattern apertures 610 receives the first invisible light 419 emitted from a respective one of the first plurality of invisible light emitters 413. In one embodiment, the first plurality of pattern apertures 610 are designed from the first opaque substrate 416. In one embodiment, the first opaque substrate 416 is coupled to the first object housing 412. In one embodiment, the first opaque substrate 416 comprises material that is opaque to the first invisible light 419 emitted by the first plurality of invisible light emitters 413. In one embodiment, the first plurality of pattern apertures 610 is designed from at least one respective side surface 860 of the first opaque substrate 416. In one embodiment, the first plurality of pattern apertures 610 is configured to receive the first invisible light 419 emitted by the first plurality of invisible light emitters 413.

In one embodiment, once the first invisible light 419 is received by the first plurality of pattern apertures 610 at RECEIVE FIRST INVISIBLE LIGHT OPERATION 1205, process flow proceeds to EMIT SECOND INVISIBLE LIGHT HAVING SECOND IDENTIFICATION PATTERN OPERATION 1207.

In one embodiment, at EMIT SECOND INVISIBLE LIGHT HAVING SECOND IDENTIFICATION PATTERN OPERATION 1207, the second invisible light 429 having the second identification pattern 859 is emitted from at least a portion of the second plurality of invisible light emitters 423 coupled to the second object housing 422 of the second object 421. In one embodiment, the second plurality of invisible light emitters 423 are infrared light emitters. In one embodiment, the second plurality of invisible light emitters 423 comprises a plurality of light emitting diodes (LED) that emit invisible light, such as infrared light. In one embodiment, the second plurality of invisible light emitters 423 is powered by the second object power supply 424 and controlled by the second object control circuit 425.

In one embodiment, the second invisible light 429 corresponds to a second identification pattern 859. In one embodiment, the second identification pattern of EMIT SECOND INVISIBLE LIGHT HAVING SECOND IDENTIFICATION PATTERN OPERATION 1207 is distinct from the first identification pattern of EMIT FIRST INVISIBLE LIGHT HAVING FIRST IDENTIFICATION PATTERN OPERATION 1203. In one embodiment, the second object control circuit 425 activates a second portion of the second plurality of invisible light emitters 423 to emit the second invisible light 429. In one embodiment, the second identification pattern 859 of the second invisible light 429 is based on the activation of a number of the second plurality of invisible light emitters 423. In one embodiment, the second identification pattern 859 of the second invisible light 429 is based on the position of each of the second plurality of invisible light emitters 423 that are activated.

In one embodiment, once the second invisible light 429 having the second identification pattern 859 is emitted from at least a portion of the second plurality of invisible light emitters 423 at EMIT SECOND INVISIBLE LIGHT HAVING SECOND IDENTIFICATION PATTERN OPERATION 1207, process flow proceeds to RECEIVE SECOND INVISIBLE LIGHT OPERATION 1209.

In one embodiment, at RECEIVE SECOND INVISIBLE LIGHT OPERATION 1209, a respective one of the second plurality of pattern apertures 610 receives the second invisible light 429 emitted from a respective one of the second plurality of invisible light emitters 423. In one embodiment, the second plurality of pattern apertures 610 are designed from the second opaque substrate 426. In one embodiment, the second opaque substrate 426 is coupled to the second object housing 422. In one embodiment, the second opaque substrate 426 comprises material that is opaque to the second invisible light 429 emitted by the second plurality of invisible light emitters 423. In one embodiment, the second plurality of pattern apertures 610 is designed from at least one respective side surface 860 of the second opaque substrate 426. In one embodiment, the second plurality of pattern apertures 610 is configured to receive the second invisible light 429 emitted by the second plurality of invisible light emitters 423.

In one embodiment, once the second invisible light 429 is received by the second plurality of pattern apertures 610 at RECEIVE SECOND INVISIBLE LIGHT OPERATION 1209, process flow proceeds to SENSE FIRST INVISIBLE LIGHT OPERATION 1211.

In one embodiment, at SENSE FIRST INVISIBLE LIGHT OPERATION 1211, the first invisible light 419 is sensed by the invisible light sensor 407 coupled to the device housing 402 of the device 401. In one embodiment, the invisible light sensor 407 is configured to sense invisible light within the invisible light spectrum emitted by the first plurality of invisible light emitters 413. In one embodiment, the first plurality of invisible light emitters 413 emits infrared light, and the invisible light sensor 407 senses such infrared light.

In one embodiment, once the first invisible light 419 is sensed by the invisible light sensor 407 at SENSE FIRST INVISIBLE LIGHT OPERATION 1211, process flow proceeds to DETECT FIRST IDENTIFICATION PATTERN OPERATION 1213.

In one embodiment, at DETECT FIRST IDENTIFICATION PATTERN OPERATION 1213, the device control circuit 405 detects the first identification pattern 859 of the first invisible light 419 sensed by the invisible light sensor 407. In one embodiment, the device control circuit 405 is coupled to the device housing 402 of the device 401. In one embodiment, the device control circuit 405 is electronically coupled to the invisible light sensor 407. In one embodiment, the device control circuit 405 controls the invisible light sensor 407 to sense invisible light.

In one embodiment, once the device control circuit 405 detects the first identification pattern 859 of the first invisible light 419 at DETECT FIRST IDENTIFICATION PATTERN OPERATION 1213, process flow proceeds to DETERMINE FIRST UNIQUE IDENTIFIER OPERATION 1215.

In one embodiment, at DETERMINE FIRST UNIQUE IDENTIFIER OPERATION 1215, the device control circuit 405 determines the first unique identifier 1083 based on the first identification pattern 859. In one embodiment, the device 401 includes a processor utilized by the device control circuit 405 to determine the first unique identifier 1083. In one embodiment, the device 401 includes memory utilized by the device control circuit 405 to determine the first unique identifier 1083. For example, the first identification pattern 859 may include information regarding error correction, a mapping of that error correction may be stored in the memory, and the processor may process an error and correct the error based on the mapping of the error correction stored in the memory.

In one embodiment, once the device control circuit 405 determines the first unique identifier 1083 at DETERMINE FIRST UNIQUE IDENTIFIER OPERATION 1215, process flow proceeds to SENSE SECOND INVISIBLE LIGHT OPERATION 1217.

In one embodiment, at SENSE SECOND INVISIBLE LIGHT OPERATION 1217, the second invisible light 429 is sensed by the invisible light sensor 407 coupled to the device housing 402 of the device 401. In one embodiment, the invisible light sensor 407 is configured to sense invisible light within the invisible light spectrum emitted by the second plurality of invisible light emitters 423. In one embodiment, the second plurality of invisible light emitters 423 emits infrared light, and the invisible light sensor 407 senses such infrared light.

In one embodiment, once the second invisible light 429 is sensed by the invisible light sensor 407 at SENSE SECOND INVISIBLE LIGHT OPERATION 1217, process flow proceeds to DETECT SECOND IDENTIFICATION PATTERN OPERATION 1219.

In one embodiment, at DETECT SECOND IDENTIFICATION PATTERN OPERATION 1219, the device control circuit 405 detects the second identification pattern 859 of the second invisible light 429 sensed by the invisible light sensor 407. In one embodiment, the device control circuit 405 is coupled to the device housing 402 of the device 401. In one embodiment, the device control circuit 405 is electronically coupled to the invisible light sensor 407. In one embodiment, the device control circuit 405 controls the invisible light sensor 407 to sense invisible light.

In one embodiment, once the device control circuit 405 detects the second identification pattern 859 at DETECT SECOND IDENTIFICATION PATTERN OPERATION 1219, process flow proceeds to DETERMINE SECOND UNIQUE IDENTIFIER OPERATION 1221.

In one embodiment, at DETERMINE SECOND UNIQUE IDENTIFIER OPERATION 1221, the device control circuit 405 determines the second unique identifier 1083 based on the second identification pattern 859. In one embodiment, the second unique identifier of DETERMINE SECOND UNIQUE IDENTIFIER OPERATION 1221 is distinct from the first unique identifier of DETERMINE FIRST UNIQUE IDENTIFIER OPERATION 1215. In one embodiment, the device 401 includes a processor utilized by the device control circuit 405 to determine the second unique identifier 1083. In one embodiment, the device 401 includes memory utilized by the device control circuit 405 to determine the second unique identifier 1083. For example, the second identification pattern 859 may include information regarding error correction, a mapping of that error correction may be stored in the memory, and the processor may process an error and correct the error based on the mapping of the error correction stored in the memory.

In one embodiment, once the device control circuit 405 determines the second unique identifier 1083 at DETERMINE SECOND UNIQUE IDENTIFIER OPERATION 1221, process flow proceeds to EXIT OPERATION 1223.

In one embodiment, at EXIT OPERATION 1223, the process 1200 for unique identifier detection is exited.

In one embodiment, the process 1200 includes additional objects such as a third object 211N. In this embodiment, the third plurality of invisible light emitters 213N of the third object 211N emits third invisible light 219N having a third identification pattern 859. In this embodiment, the invisible light sensor 207 of the device 201 senses the third invisible light 219N emitted by the third object 211N. In this embodiment, the device control circuit 405 of the device 201 detects the third identification pattern 859 and determines a third unique identifier 1083 based on the third identification pattern 859. It is to be understood that any number of objects 211A and 211B through 211N can be included in the process 1200.

Figure 13:
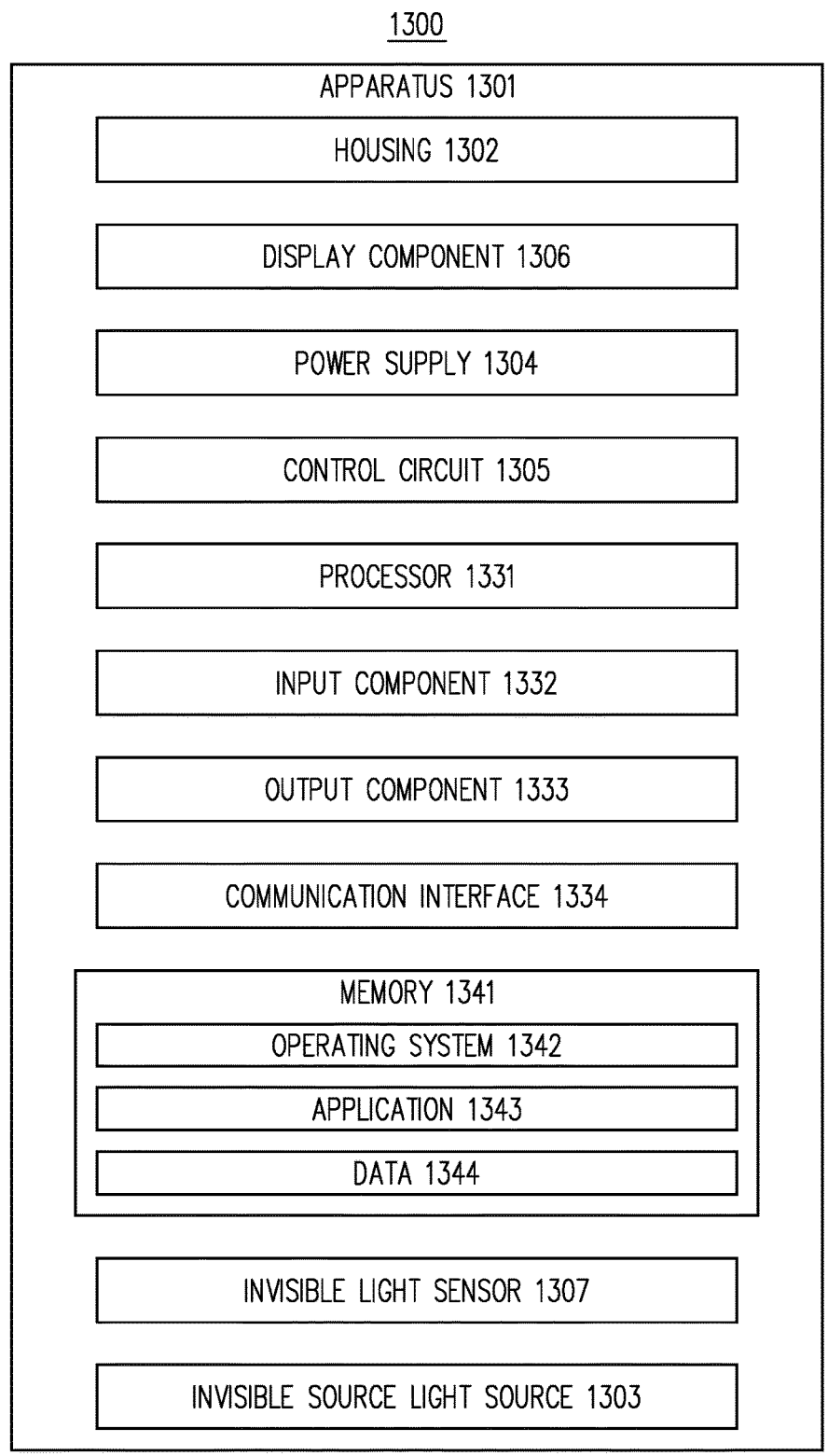
FIG. 13 is a block diagram of an apparatus of a unique identifier detection system, in accordance with one embodiment.

FIG. 13 is a block diagram of an apparatus 1301 of a unique identifier detection system 1300, in accordance with one embodiment. It is to be understood that certain components of the apparatus 1301 are optional. In one embodiment, the apparatus 1301 is a device, such as the device 301 of FIG. 3 and the device 401 of FIG. 4. For example, the apparatus 1301 may be an electronic device such as a smartphone used to identify objects. In one embodiment, the apparatus 1301 is an object, such as the first object 311 of FIG. 3 and the first object 411 of FIG. 4. For example, the apparatus 1301 may be an electronic object such as an Internet of Things (IoT) object.

The apparatus 1301 may be implemented as any of a number of electronic apparatuses, such as a tablet computing device, a smartphone, a media player, a portable gaming device, a portable digital assistant, a laptop computer, a desktop computer, and other electronic apparatuses, as discussed herein, or as known in the art at the time of filing, or as developed, or becomes available, after the time of filing. It should be understood that various types of computing components, including a processor, a memory, and a user interface for receiving user input and displaying user output, can be used in accordance with various embodiments discussed herein.

In one embodiment, the apparatus 1301 includes a housing 1302, to which various components may be housed. In one embodiment, the housing 1302 corresponds to the device housing 302 of the device 301 of FIG. 3 and the device housing 402 of the device 401 of FIG. 4. In one embodiment, the housing 1302 corresponds to the first object housing 312 of the first object 311 of FIG. 3 and the first object housing 412 of the first object 411 of FIG. 4.

In one embodiment, the apparatus 1301 includes a display component 1306. In one embodiment, the display component 1306 includes, for example, cathode ray tubes (CRTs), liquid crystal display (LCD) screens, gas plasma-based flat panel displays, LCD projectors, or other types of display components, as discussed herein, or as known in the art at the time of filing, or as developed, or becomes available, after the time of filing. In one embodiment, the display component 1306 corresponds to the display component 306 of the device 301 of FIG. 3 and the display component 406 of the device 401 of FIG. 4.

In one embodiment, the apparatus 1301 includes one or more input components 1332 operable to receive inputs from a user. In one embodiment, the input components 1332 include, for example, a push button, touch pad, touch screen, wheel, joystick, keyboard, mouse, trackball, keypad, accelerometer, light gun, game controller, or any other such component with which a user can provide inputs, as discussed herein, or as known in the art at the time of filing, or as developed, or becomes available, after the time of filing. In one embodiment, the input component 1332 is incorporated into the apparatus 1301. In one embodiment, the input component 1332 is operably coupled to the apparatus 1301 via a wired or wireless interface. In one embodiment, for an apparatus 1301 with a touch sensitive display, the input component 1332 includes a touch sensor that operates in conjunction with the display component 1306 to permit users to interact with the image displayed by the display component 1306 using touch inputs (e.g., with a finger or stylus). In one embodiment, the apparatus 1301 includes one or more output components 1333, such as one or more audio speakers.

In one embodiment, the apparatus 1301 includes a communication interface 1334, comprising one or more wireless components operable to communicate with one or more separate apparatuses within a communication range of the particular wireless protocol. The wireless protocol can be any appropriate protocol used to enable apparatuses to communicate wirelessly, such as Bluetooth, cellular, IEEE 802.11, infrared communications protocols, such as an IrDA-compliant protocol, and other protocols, as discussed herein, or as known in the art at the time of filing, or as developed, or becomes available, after the time of filing. In one embodiment, the apparatus 1301 includes one or more wired communications interfaces for coupling and communicating with other apparatuses.

In one embodiment, the apparatus 1301 includes a power supply 1304, such as, for example, a rechargeable battery operable to be recharged through conventional plug-in approaches, or through other approaches such as capacitive charging. In one embodiment, the power supply 1304 includes a user switch with which the user can turn the apparatus 1301 on and off. In one embodiment, the power supply 1304 corresponds to the device power supply 304 of the device 301 of FIG. 3 and the device power supply 404 of the device 401 of FIG. 4. In one embodiment, the power supply 1304 corresponds to the first object power supply 314 of the first object 311 of FIG. 3 and the first object power supply 414 of the first object 411 of FIG. 4. In one embodiment, the apparatus 1301 includes a control circuit 1305, as discussed herein, or as known in the art at the time of filing, or as developed, or becomes available, after the time of filing. In one embodiment, the control circuit 1305 corresponds to the device control circuit 305 of the device 301 of FIG. 3 and the device control circuit 405 of the device 401 of FIG. 4. In one embodiment, the control circuit 1305 corresponds to the first object control circuit 315 of the first object 311 of FIG. 3 and the first object control circuit 415 of the first object 411 of FIG. 4.

In one embodiment, the apparatus 1301 includes a processor 1331 for executing instructions and retrieving data stored in a memory 1341. In one embodiment, the memory 1341 includes one or more different types of memory, data storage or computer-readable storage media, such as, for example, a first data storage for program instructions for execution by the processor 1331, and a second data storage for images or data and/or a removable storage for transferring data to other devices. In one embodiment, the memory 1341 stores software for execution by the processor 1331, such as, for example, operating system software 1342 and application software 1343. In one embodiment, the memory 1341 stores a data item 1344, such as, for example, data files corresponding to one or more applications 1343.

In one embodiment, the apparatus 1301 includes an invisible light sensor 1307, as discussed herein, or as known in the art at the time of filing, or as developed, or becomes available, after the time of filing. In one embodiment, the invisible light sensor 1307 corresponds to the invisible light sensor 307 of the device 301 of FIG. 3 and the invisible light sensor 407 of the device 401 of FIG. 4. In one embodiment, the apparatus 1301 includes an invisible light source 1303, as discussed herein, or as known in the art at the time of filing, or as developed, or becomes available, after the time of filing. In one embodiment, the invisible light source 1303 corresponds to the first invisible light source 313 of the first object 311 of FIG. 3 and the first plurality of invisible light emitters 413 of the first object 411 of FIG. 4.

Term Definitions

Various embodiments of systems and methods described herein include one or more computers, which may also be referred to herein as systems, computing systems or processors. As used herein the term computer includes any programmable machine or machines capable of performing arithmetic and/or logical operations. In various embodiments, computers include one or more of processors, memories, data storage devices, and/or other components as discussed herein, and/or as known in the art at the time of filing, and/or as developed after the time of filing. In various embodiments, these components are connected physically or through network or wireless links. In various embodiments, computers include software which directs the operations of the aforementioned components. In various embodiments, the software can thereby transform the aforementioned computers and components into special purpose computers and components.

Herein, computers may also be referred to with terms that are commonly used by those of ordinary skill in the relevant arts, such as servers, PCs, mobile devices, routers, switches, data centers, distributed computers, and other terms. In various embodiments, computers facilitate communications between users and/or other computers, provide databases, perform analysis and/or transformation of data, and/or perform other functions. It will be understood by those of ordinary skill that those terms used herein are interchangeable, and any computer capable of performing the described functions may be used.

In various embodiments, computers may be linked to one another via a network or networks. In various embodiments, a network is any plurality of completely or partially interconnected computers wherein some or all of the computers are able to communicate with one another. It will be understood by those of ordinary skill that connections between computers may be wired in some cases (e.g., via Ethernet, coaxial, optical, or other wired connection) or may be wireless (e.g., via Wi-Fi, WiMax, or other wireless connections). In various embodiments, connections between computers may use any protocols, including connection-oriented protocols such as TCP or connectionless protocols such as UDP. Any connection through which at least two computers may exchange data can be the basis of a network.

Herein, the term "production environment" includes the various components, or assets, used to deploy, implement, access, and use, a given application as that application is intended to be used. In various embodiments, production environments include multiple computers and/or assets that are combined, communicatively coupled, virtually and/or physically connected, and/or associated with one another, to provide the production environment implementing the application.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. The hardware systems may employ processing logic that includes one or more processors, microprocessors, multi-core processors, and/or Field Programmable Gate Arrays (FPGAs) to execute operations disclosed herein. One or more memory (volatile and/or non-volatile) may be communicatively coupled to the processing logic to store instructions to execute operations and/or store data. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

Herein, a data management system can be, but is not limited to, any system or application implemented on a computing system, accessed through one or more servers, accessed through a network, accessed through a cloud, and/or provided through any system or by any means, as discussed herein, and/or as known in the art at the time of filing, and/or as developed after the time of filing, that gathers data from one or more sources and/or has the capability to analyze and categorize at least part of the data.

Herein, a financial management system can be, but is not limited to, any data management system implemented on a computing system, accessed through one or more servers, accessed through a network, accessed through a cloud, and/or provided through any system or by any means, as discussed herein, and/or as known in the art at the time of filing, and/or as developed after the time of filing, that gathers financial data, including financial transactional data, from one or more sources and/or has the capability to analyze and categorize at least part of the financial data.

As used herein, the term financial management system includes, but is not limited to the following: computing system implemented, and/or online, and/or web-based, personal and/or business financial data management systems, services, packages, programs, modules, or applications; computing system implemented, and/or online, and/or web-based, personal and/or business tax preparation systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filling or as developed later.

As used herein, the terms "artificial intelligence," "machine learning," and "machine learning algorithms" include, but are not limited to, machine learning algorithms for predictive model training operations such as one or more of artificial intelligence operations, regression, logistic regression, decision trees, artificial neural networks, support vector machines, linear regression, nearest neighbor methods, distance based methods, naive Bayes, linear discriminant analysis, k-nearest neighbor algorithm, another query classifier, and any other presently known or later developed predictive model training operations, according to one embodiment.

As used herein, the terms "user," "client," and "customer" include, but are not limited to, any party, parties, entity, or entities using, or otherwise interacting with any of the methods or systems discussed herein. For instance, in various embodiments, a user can be, but is not limited to, a person, a commercial entity, an application, a service, or a computing system.

As used herein, the term "user system" includes, but is not limited to, the following: a computing system; a computing device; a computing entity; a server; a workstation; a desktop computing system; a mobile computing system, including, but not limited to, one or more of smart phones, portable devices, and devices worn or carried by a user; or any device, subsystem, or mechanism that includes components that can execute all, or part, of any one of the processes or operations, as discussed herein, or as known in the art at the time of filing, or as developed, or becomes available, after the time of filing.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant.

Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining," "training," "extracting," "executing," "mapping," "analyzing," "providing," "enforcing," "monitoring," "generating," "defining," "determining," "calculating," "transforming," "correlating," "normalizing," "accessing," "analyzing," "obtaining," "identifying," "associating," "aggregating," "initiating," "collecting," "creating," "transferring," "storing," "searching," "comparing," "providing," "processing" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes by a computer program stored via a computer program product as defined herein that can be accessed by a computing system or other device to transform the computing system or other device into a specifically and specially programmed computing system or another device.

Those of skill in the art will readily recognize that the algorithms and operations presented herein are not inherently related to any particular computing system, computer architecture, computer or industry standard, or any other specific apparatus. It may prove convenient/efficient to construct or transform one or more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

It should also be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the figures are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:

1. A unique identifier detection system, comprising:
a first object comprising a first object housing;
a first invisible light source coupled to the first object housing and configured to emit first invisible light;
a first opaque substrate coupled to the first object housing, the first opaque substrate comprising material opaque to invisible light emitted by the first invisible light source, the first opaque substrate defining a first aperture design configured to receive the first invisible light from the first invisible light source and to form a first identification pattern, wherein the first aperture design comprises a first one or more apertures defined by the first opaque substrate;
a second object comprising a second object housing;
a second invisible light source coupled to the second object housing and configured to emit second invisible light;
a second opaque substrate coupled to the second object housing, the second opaque substrate comprising material opaque to invisible light emitted by the second invisible light source, the second opaque substrate defining a second aperture design configured to receive the second invisible light from the second invisible light source and to form a second identification pattern distinct from the first identification pattern, wherein the second aperture design comprises a second one or more apertures defined by the second opaque substrate;

a device comprising a device housing;
an invisible light sensor coupled to the device housing and configured to sense the first invisible light and to sense the second invisible light; and
a device control circuit coupled to the device housing and electronically coupled to the invisible light sensor, the device control circuit configured to detect the first identification pattern of the first invisible light and to determine a first object unique identifier based on the first identification pattern, and configured to detect the second identification pattern of the second invisible light and to determine a second object unique identifier based on the second identification pattern.

2. The system of claim 1, wherein the first invisible light source comprises a first infrared light emitter, material of the first opaque substrate is opaque to infrared light emitted by the first infrared light emitter, the second invisible light source comprises a second infrared light emitter, and material of the second opaque substrate is opaque to infrared light emitted by the second infrared light emitter.

3. The system of claim 2, wherein the first infrared light emitter comprises a first infrared light emitting diode, and the second infrared light emitter comprises a second infrared light emitting diode.

4. The system of claim 1, wherein the first identification pattern corresponds to a first quick response code, and the second identification pattern corresponds to a second quick response code.

5. The system of claim 1, further comprising:
a first transparent substrate coupled to the first opaque substrate, the first transparent substrate configured to provide a first layer over the first aperture design, wherein material of the first transparent substrate is transparent to invisible light emitted by the first invisible light source; and
a second transparent substrate coupled to the second opaque substrate, the second transparent substrate configured to provide a second layer over the second aperture design, wherein material of the second transparent substrate is transparent to invisible light emitted by the second invisible light source.

6. The system of claim 1, further comprising:
a display component coupled to the device housing and electronically coupled to the device control circuit, the display component configured to display the first object unique identifier and the second object unique identifier.

7. The system of claim 1, wherein the first aperture design comprises a first fiducial marker design, the device control circuit is configured to determine a first orientation of the first aperture design based on the first fiducial marker design, the second aperture design comprises a second fiducial marker design, and the device control circuit is configured to determine a second orientation of the second aperture design based on the second fiducial marker design.

8. A method for unique identifier detection, comprising:
emitting first invisible light from a first invisible light source coupled to a first object housing of a first object;
forming from the first invisible light a first identification pattern based on a first aperture design designed from a first opaque substrate coupled to the first object housing and comprising material opaque to invisible light emitted by the first invisible light source, the first aperture design configured to receive the first invisible light;
emitting second invisible light from a second invisible light source coupled to a second object housing of a second object;
forming from the second invisible light a second identification pattern distinct from the first identification pattern based on a second aperture design designed from a second opaque substrate coupled to the second object housing and comprising material opaque to invisible light emitted by the second invisible light source, the second aperture design configured to receive the second invisible light;
sensing the first invisible light by an invisible light sensor coupled to a device housing of a device;
detecting the first identification pattern of the first invisible light by a device control circuit coupled to the device housing and electronically coupled to the invisible light sensor;
determining a first unique identifier based on the first identification pattern by the device control circuit;
sensing the second invisible light by the invisible light sensor coupled to the device housing of the device;
detecting the second identification pattern of the second invisible light by the device control circuit coupled to the device housing and electronically coupled to the invisible light sensor; and
determining a second unique identifier based on the second identification pattern by the device control circuit.

9. The method of claim 8, further comprising:
emitting third invisible light from a third invisible light source coupled to a third object housing of a third object;
forming from the third invisible light a third identification pattern distinct from the first identification pattern and the second identification pattern based on a third aperture design designed from a third opaque substrate coupled to the third object housing and comprising material opaque to invisible light emitted by the third invisible light source, the third aperture design configured to receive the third invisible light;
sensing the third invisible light by the invisible light sensor coupled to the device housing of the device;
detecting the third identification pattern of the third invisible light by the device control circuit coupled to the device housing and electronically coupled to the invisible light sensor; and
determining a third unique identifier based on the third identification pattern by the device control circuit.

10. The method of claim 8, wherein the first invisible light source comprises a first infrared light emitter, material of the first opaque substrate is opaque to infrared light emitted by the first infrared light emitter, the second invisible light source comprises a second infrared light emitter, and material of the second opaque substrate is opaque to infrared light emitted by the second infrared light emitter.

11. The method of claim 10, wherein the first infrared light emitter comprises a first infrared light emitting diode, and the second infrared light emitter comprises a second infrared light emitting diode.

12. The method of claim 8, wherein the first opaque substrate is coupled to a first transparent substrate configured to provide a first layer over the first aperture design, wherein material of the first transparent substrate is transparent to invisible light emitted by the first invisible light source, and wherein the second opaque substrate is coupled to a second transparent substrate configured to provide a second layer over the second aperture design, wherein material of the second transparent substrate is transparent to invisible light emitted by the second invisible light source.

13. The method of claim 8, further comprising:
displaying, on a display component coupled to the device housing and electronically coupled to the device control circuit, the first object unique identifier and the second object unique identifier.

14. A unique identifier detection system, comprising:
a first object comprising a first object housing;
a first plurality of invisible light emitters coupled to the first object housing and configured to emit first invisible light corresponding to a first identification pattern;
a first opaque substrate coupled to the first object housing, the first opaque substrate comprising material opaque to invisible light emitted by the first plurality of invisible light emitters, the first opaque substrate defining a first plurality of pattern apertures configured to receive invisible light from a respective one of the first plurality of invisible light emitters, wherein each of the first plurality of invisible light emitters corresponds to a respective one of the first plurality of pattern apertures;
a second object comprising a second object housing;
a second plurality of invisible light emitters coupled to the second object housing and configured to emit second invisible light corresponding to a second identification pattern distinct from the first identification pattern;
a second opaque substrate coupled to the second object housing, the second opaque substrate comprising material opaque to invisible light emitted by the second plurality of invisible light emitters, the second opaque substrate defining a second plurality of pattern apertures configured to receive invisible light from a respective one of the second plurality of invisible light emitters, wherein each of the second plurality of invisible light emitters corresponds to a respective one of the second plurality of pattern apertures;
a device comprising a device housing;
an invisible light sensor coupled to the device housing and configured to sense the first invisible light and to sense the second invisible light; and
a device control circuit coupled to the device housing and electronically coupled to the invisible light sensor, the device control circuit configured to detect the first identification pattern of the first invisible light and to determine a first object unique identifier based on the first identification pattern, and configured to detect the second identification pattern of the second invisible light and to determine a second object unique identifier based on the second identification pattern.

15. The system of claim 14, further comprising:
a first object control circuit coupled to the first object housing and electronically coupled to the first plurality of invisible light emitters, wherein the first object control circuit is configured to activate a first portion of the first plurality of invisible light emitters; and
a second object control circuit coupled to the second object housing and electronically coupled to the second plurality of invisible light emitters, wherein the second object control circuit is configured to activate a second portion of the second plurality of invisible light emitters.

16. The system of claim 14, wherein a first number of invisible light emitters of the first plurality of invisible light emitters is less than a second number of pattern apertures of the first plurality of pattern apertures, and a third number of invisible light emitters of the second plurality of invisible light emitters is less than a fourth number of pattern apertures of the second plurality of pattern apertures, wherein the first number is different from the third number, wherein at least one of the first number of invisible light emitters has a different respective position than another one of the second number of invisible light emitters.

17. The system of claim 14, wherein the first plurality of infrared light emitters comprises a first plurality of infrared light emitting diodes, and the second plurality of infrared light emitters comprises a second plurality of infrared light emitting diodes.

18. The system of claim 14, further comprising:
a first transparent substrate coupled to the first opaque substrate, the first transparent substrate configured to provide a first layer over the first plurality of pattern apertures, wherein material of the first transparent substrate is transparent to invisible light emitted by the first plurality of invisible light emitters; and
a second transparent substrate coupled to the second opaque substrate, the second transparent substrate configured to provide a second layer over the second plurality of pattern apertures, wherein material of the second transparent substrate is transparent to invisible light emitted by the second plurality of invisible light emitters.

19. The system of claim 14, further comprising:
a display component coupled to the device housing and electronically coupled to the device control circuit, the display component configured to display the first object unique identifier and the second object unique identifier.

20. The system of claim 14, wherein the first identification pattern comprises a first fiducial marker pattern formed from a first portion of the first plurality of invisible light emitters, the device control circuit is configured to determine a first orientation of the first identification pattern based on the first fiducial marker pattern, the second identification pattern comprises a second fiducial marker pattern formed from a second portion of the second plurality of invisible light emitters, and the device control circuit is configured to determine a second orientation of the second identification pattern based on the second fiducial marker pattern.

21. A method for unique identifier detection, comprising:
emitting first invisible light from a first plurality of invisible light emitters coupled to a first object housing of a first object, the first invisible light corresponding to a first identification pattern;
receiving, by a respective one of a first plurality of pattern apertures designed from a first opaque substrate, invisible light emitted from a respective one of the first plurality of invisible light emitters, the first opaque substrate coupled to the first object housing and comprising material opaque to invisible light emitted by the first plurality of invisible light emitters, each of the first plurality of invisible light emitters corresponding to a respective one of the first plurality of pattern apertures;
emitting second invisible light from a second plurality of invisible light emitters coupled to a second object housing of a second object, the second invisible light corresponding to a second identification pattern distinct from the first identification pattern;
receiving, by a respective one of a second plurality of pattern apertures designed from a second opaque substrate, invisible light emitted from a respective one of the second plurality of invisible light emitters, the second opaque substrate coupled to the second object housing and comprising material opaque to invisible light emitted by the second plurality of invisible light emitters, each of the second plurality of invisible light emitters corresponding to a respective one of the second plurality of pattern apertures;

sensing the first invisible light by an invisible light sensor coupled to a device housing of a device;

detecting the first identification pattern of the first invisible light by a device control circuit coupled to the device housing and electronically coupled to the invisible light sensor;

determining a first unique identifier based on the first identification pattern by the device control circuit;

sensing the second invisible light by the invisible light sensor coupled to the device housing of the device;

detecting the second identification pattern of the second invisible light by the device control circuit coupled to the device housing and electronically coupled to the invisible light sensor; and determining a second unique identifier based on the second identification pattern by the device control circuit.

22. The method of claim 21, further comprising:

emitting third invisible light from a third plurality of invisible light emitters coupled to a third object housing of a third object, the third invisible light corresponding to a third identification pattern distinct from the first identification pattern and the second identification pattern;

receiving, by a respective one of a third plurality of pattern apertures designed from a third opaque substrate, invisible light emitted from a respective one of the third plurality of invisible light emitters, the third opaque substrate coupled to the third object housing and comprising material opaque to invisible light emitted by the third plurality of invisible light emitters, each of the third plurality of invisible light emitters corresponding to a respective one of the third plurality of pattern apertures;

sensing the third invisible light by the invisible light sensor coupled to the device housing of the device;

detecting the third identification pattern of the third invisible light by the device control circuit coupled to the device housing and electronically coupled to the invisible light sensor; and determining a third unique identifier based on the third identification pattern by the device control circuit.

23. The method of claim 21, further comprising:

activating a first portion of the first plurality of invisible light emitters by a first object control circuit coupled to the first object housing and electronically coupled to the first plurality of invisible light emitters; and activating a second portion of the second plurality of invisible light emitters by a second object control circuit coupled to the second object housing and electronically coupled to the second plurality of invisible light emitters.

24. The method of claim 21, wherein the first plurality of invisible light emitters comprises a first plurality of infrared light emitting diodes, material of the first opaque substrate is opaque to infrared light emitted by the first infrared light emitter, the second plurality of invisible light emitters comprises a second plurality of infrared light emitting diodes, and material of the second opaque substrate is opaque to infrared light emitted by the second infrared light emitter.

25. The method of claim 21, wherein the first opaque substrate is coupled to a first transparent substrate configured to provide a first layer over the first pattern apertures, wherein material of the first transparent substrate is transparent to invisible light emitted by the first plurality of invisible light emitters, and wherein the second opaque substrate is coupled to a second transparent substrate configured to provide a second layer over the second pattern apertures, wherein material of the second transparent substrate is transparent to invisible light emitted by the second plurality of invisible light emitters.

26. The method of claim 21, further comprising:

displaying, on a display component coupled to the device housing and electronically coupled to the device control circuit, the first object unique identifier and the second object unique identifier.

\* \* \* \* \*